US012604115B2

(12) United States Patent
Kurata

(10) Patent No.: US 12,604,115 B2
(45) Date of Patent: Apr. 14, 2026

(54) PHOTOELECTRIC CONVERSION DEVICE, MOVABLE APPARATUS, CONTROL METHOD, AND STORAGE MEDIUM

(71) Applicant: CANON KABUSHIKI KAISHA, Tokyo (JP)

(72) Inventor: Yuya Kurata, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 80 days.

(21) Appl. No.: 18/800,186

(22) Filed: Aug. 12, 2024

(65) Prior Publication Data

US 2025/0080879 A1     Mar. 6, 2025

(30) Foreign Application Priority Data

Aug. 29, 2023     (JP) ................................. 2023-139371

(51) Int. Cl.
H04N 25/773     (2023.01)
G01S 17/931     (2020.01)
(Continued)

(52) U.S. Cl.
CPC ......... H04N 25/773 (2023.01); G01S 17/931 (2020.01); H04N 25/771 (2023.01);
(Continued)

(58) Field of Classification Search
CPC .. H04N 25/705; H04N 25/771; H04N 25/772; H04N 25/773; H04N 25/7795; H04N 25/79; G01S 17/86; G01S 17/931
See application file for complete search history.

(56) References Cited

U.S. PATENT DOCUMENTS

2018/0338102 A1*  11/2018  Saito ...................... H04N 25/77
2022/0353441 A1*  11/2022  Muraoka .............. H04N 25/443
(Continued)

FOREIGN PATENT DOCUMENTS

JP        2021-034786 A      3/2021
JP        7223070 B2        2/2023

*Primary Examiner* — Lin Ye
*Assistant Examiner* — Chriss S Yoder, III
(74) *Attorney, Agent, or Firm* — Carter, DeLuca & Farrell LLP

(57) ABSTRACT

A signal is generated based on a difference between count values for a counter between a start time and an end time of an accumulation period in a photoelectric conversion unit; control is performed such that a signal that is generated during a first accumulation period that is shorter than a second accumulation period is output during a time from an end of the first accumulation period until an end of the second accumulation period wherein one full frame period includes the first accumulation period and the second accumulation period that is longer than the first accumulation period; it is made possible to set, in a sensor unit consisting of the plurality of pixels, a first pixel region having at least the first accumulation period and the second accumulation period, and a second pixel region having at least the second accumulation period; and the first pixel region and the second pixel region are set based on at least one type of information from among characteristic information relating to characteristics of a photoelectric conversion device, installation information relating to an installation state of the photoelectric conversion device, and environmental information relating to a surrounding environment of the photoelectric conversion device.

17 Claims, 27 Drawing Sheets

(51) Int. Cl.
    *H04N 25/76*        (2023.01)
    *H04N 25/771*      (2023.01)
    *H04N 25/772*      (2023.01)
    *H04N 25/79*       (2023.01)

(52) U.S. Cl.
    CPC ....... *H04N 25/772* (2023.01); *H04N 25/7795*
               (2023.01); *H04N 25/79* (2023.01)

(56)            References Cited

U.S. PATENT DOCUMENTS

| 2024/0340546 | A1* | 10/2024 | Mahara | ................ | H04N 25/772 |
| 2024/0402311 | A1* | 12/2024 | Kimura | ................ | G01S 7/4863 |
| 2025/0080880 | A1 | 3/2025 | Kurata | | |

* cited by examiner

F1_1    F1_2    F1_3    F1_4

ACCUMULATION PERIOD

PHOTOELECTRIC CONVERSION DEVICE, MOVABLE APPARATUS, CONTROL METHOD, AND STORAGE MEDIUM

BACKGROUND OF THE INVENTION

Field of the Invention

The present invention relates to a photoelectric conversion device, a movable apparatus, a control method, a storage medium, and the like.

Description of the Related Art

In recent years, photoelectric conversion devices that digitally count a number of photons that become incident on an avalanche photo diode (APD) and output a count value from a pixel to serve as a digital signal that has been photoelectrically converted have been developed.

In addition, Japanese Patent No. 7223070 discloses a configuration in which, in a photoelectric conversion device that has APDs, it is possible to output a plurality of video images for which the accumulation periods overlap, and it becomes possible to perform continuous shooting even in low illumination. In addition, Japanese Unexamined Patent Application, First Publication No. 2021-34786 discloses a configuration in which a signal is read out with a high frame rate from a pixel region in which a moving subject has been detected.

For example, in a case in which the image capturing element of a camera is assumed, during the normal driving of a sensor unit, recognition processing is performed with a frame as the unit, and therefore, in the case of, for example, 30 fps (frames per second), recognition processing can only be performed every 33.3 ms. Therefore, in a normal camera, even if an object suddenly appears directly after the frame has changed, recognition processing cannot be applied to the subject until the end of the frame.

In contrast, if the frame rate is increased, a larger amount of noise will occur in low illumination environments. Furthermore, there is the problem that the amount of data, and the energy consumption will increase.

SUMMARY OF THE INVENTION

A photoelectric conversion device according to one aspect of the present invention comprises:

an optical system;
a plurality of pixels each of which is configured to include
  a photoelectric conversion unit that generates pulses in response to photons, a counter configured to count a number of the pulses, and a memory configured to store a count value for the counter;
one or more memories storing instructions; and
one or more processors executing the instructions to
  generate a signal based on a difference between count values for the counter between a start time and an end time of an accumulation period in the photoelectric conversion unit
perform control such that a signal that is generated during a first accumulation period that is shorter than a second accumulation period is output during a time from an end of the first accumulation period until an end of the second accumulation period wherein one full frame period includes the first accumulation period and the second accumulation period that is longer than the first accumulation period;

make it possible to set, in a sensor unit consisting of the plurality of pixels, a first pixel region having at least the first accumulation period and the second accumulation period, and a second pixel region having at least the second accumulation period; and
set the first pixel region and the second pixel region based on at least one type of information from among characteristic information relating to characteristics of a photoelectric conversion device, installation information relating to an installation state of the photoelectric conversion device, and environmental information relating to a surrounding environment of the photoelectric conversion device.

Further features of the present invention will become apparent from the following description of embodiments with reference to the attached drawings.

BRIEF DESCRIPTION OF THE DRAWINGS

FIG. 9 is a diagram showing the relationship between memories and buffers in the First Embodiment.

FIG. 14 is a functional block diagram showing a configurational example of a photoelectric conversion device 600 and a movable apparatus 700 according to a Third Embodiment.

FIG. 16 is a diagram explaining an example of setting a region of interest in a Fourth Embodiment.

FIG. 18 is a diagram explaining an example of setting a region of interest in a Seventh Embodiment.

FIG. 22 is a diagram showing an example of images for each of a plurality of accumulation periods in which the setting of a region of interest has been performed.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate descriptions will be omitted or simplified.

First Embodiment

Figure 1:
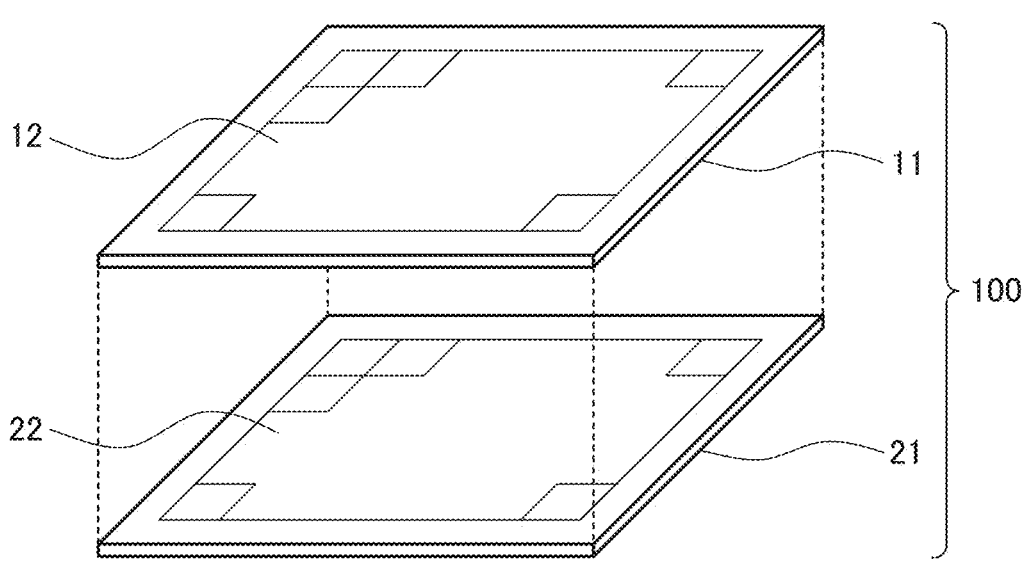
FIG. 1 is a diagram showing a configurational example of a sensor unit 100 according to the First Embodiment.

FIG. 1 is a diagram showing a configurational example of a sensor unit 100 according to the First Embodiment. Below, the sensor unit is configured by the two substrates of a sensor substrate 11, and a circuit board 21 being laminated together and electrically connected, that is, it is a so-called laminated structure.

However, this may also be a so-called non-laminated structure in which the configurations that are included in the sensor substrate 11 and the configurations that are included in the circuit board 21 are disposed on the same semiconductor. The sensor substrate 11 includes a pixel region 12. The circuit board 21 includes a circuit region 22 that processes a signal that has been detected in the pixel region 12.

Figure 2:
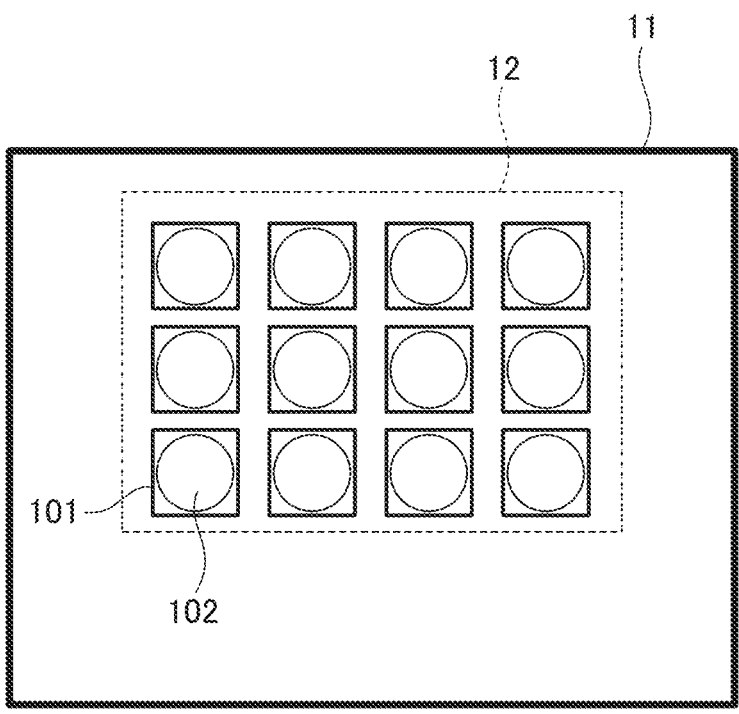
FIG. 2 is a diagram showing a configurational example of a sensor unit substrate 11 according to the First Embodiment.

FIG. 2 is a diagram showing a configurational example of the sensor substrate 11 according to the First Embodiment. The pixel region 12 of the sensor substrate 11 includes pixels 101 of which a plurality has been two-dimensionally disposed across a plurality of rows and a plurality of columns.

Each pixel 101 is provided with a photoelectric conversion unit 102 that comprises an avalanche photo diode (referred to below as an APD). In this context, the photoelectric conversion unit 102 emits pulses at a frequency according to a frequency of photon reception. That is, the photoelectric conversion unit 102 emits pulses according to the incidence of photons. Note that the number of rows and the number of columns in the pixel array that configures the pixel region 12 is not particularly limited.

Figure 3:
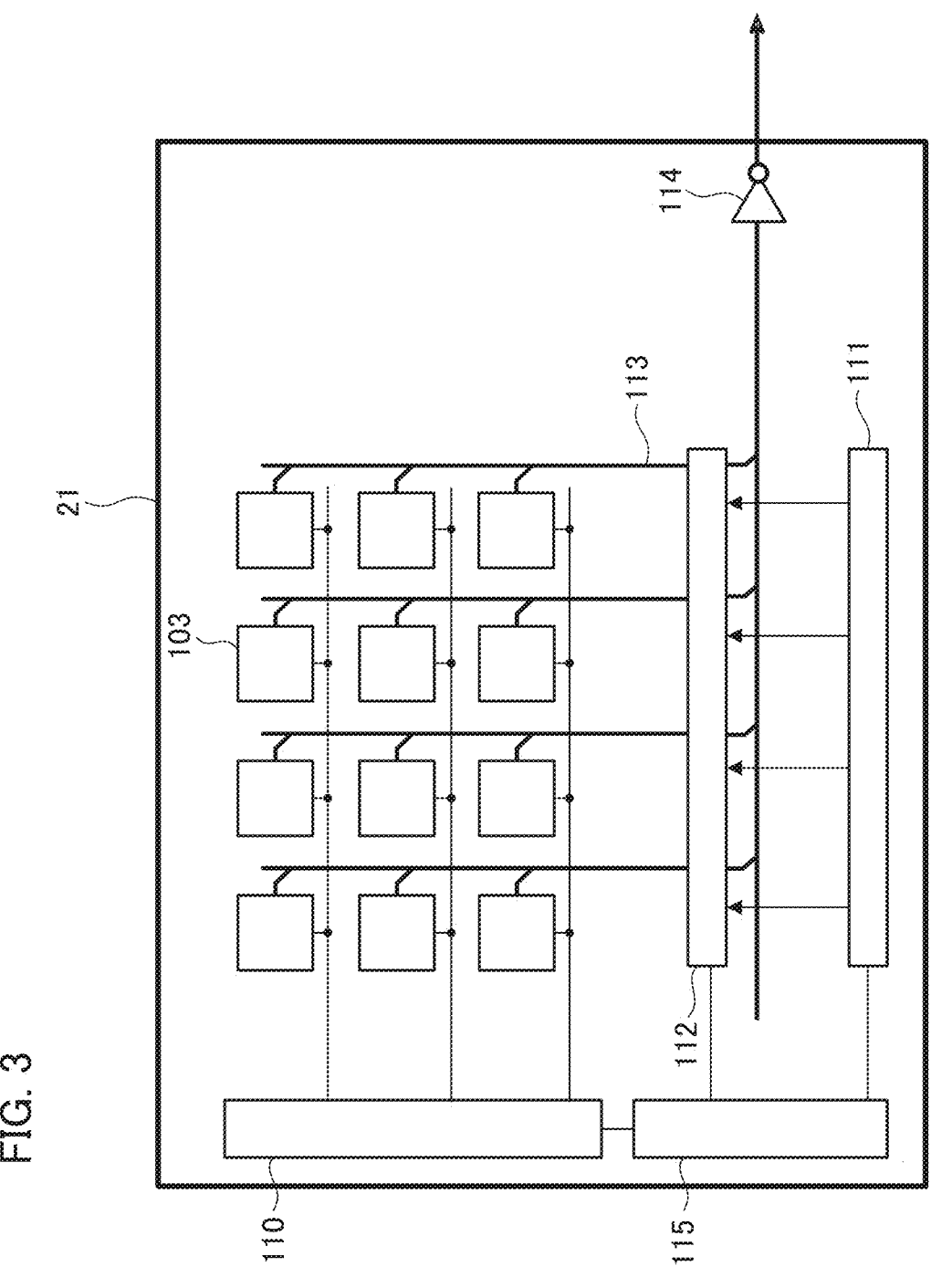
FIG. 3 is a diagram showing a configurational example of a circuit board 21 according to the First Embodiment.

FIG. 3 is a diagram showing a configurational example of the circuit board 21 according to the First Embodiment. The circuit board 21 has a signal processing circuit 103 that processes an electric charge that has been photoelectrically converted in each photoelectric conversion unit 102 of FIG. 2, a read-out circuit 112, a control pulse generating unit 115, a horizontal scanning circuit 111, a vertical signal line 113, a vertical scanning circuit 110, and an output circuit 114.

The vertical scanning circuit 110 receives a control pulse that has been supplied from the control pulse generating unit 115, and supplies the control pulse to the plurality of pixel that have been arranged in the row direction in order. The vertical scanning circuit 110 is configured from a logical circuit such as a shift register or an address decoder.

The signals that have been output from the photoelectric conversion units 102 of each pixel are processed by each signal processing circuit 103. The signal processing circuit 103 is provided with a counter, a memory, and the like, and the memory holds a digital value. The horizontal scanning circuit 111 inputs a control pulse that selects each column in order into the signal processing circuit 103 in order to read out a signal from the memory of each pixel on which the digital signals are held.

The vertical signal line 113 outputs a signal from the signal processing circuits 103 of the pixels in a row that has been selected by the vertical scanning circuit 110. The signals that have been output from the vertical signal line 113 are output to outside of the sensor unit 100 via the read-out circuit 112 and the output circuit 114. The read-out circuit 112 has a plurality of built in buffers that have been connected to each vertical signal line 113.

As is shown in FIG. 2, and FIG. 3, a plurality of signal processing circuits 103 are disposed in a region that overlaps with the pixel region 12 in the planar view. In addition, the vertical scanning circuit 110, the horizontal scanning circuit 111, the read-out circuit 112, the output circuit 114, and the control pulse generating unit 115 are disposed so as to overlap in the planar view with a region of the sensor unit 11 that is on the outer side of the pixel region 12.

That is, the sensor unit substrate 11 has the pixel region 12, and a non-pixel region that has been disposed around the pixel region 12. In addition, the vertical scanning circuit 110, the horizontal scanning circuit 111, the read-out circuit 112, the output circuit 114, and the control pulse generating unit 115 are disposed in a region that overlaps with the non-pixel region in the planar view.

Note that the placement of the vertical signal line 113, the read-out circuit 112, and the output circuit 114 are not limited to the example that has been shown in FIG. 3. For example, the vertical signal line 113 may also be disposed so as to extend in the direction of the rows, and the read-out circuit 112 may also be disposed at the end of the extension of the vertical signal line 113.

In addition, one signal processing circuit 103 does not necessarily need to be provided for each photoelectric conversion unit, and this may also be a configuration in which a plurality of photoelectric conversion units share one signal processing circuit, and signal processing is performed in order.

Figure 4:
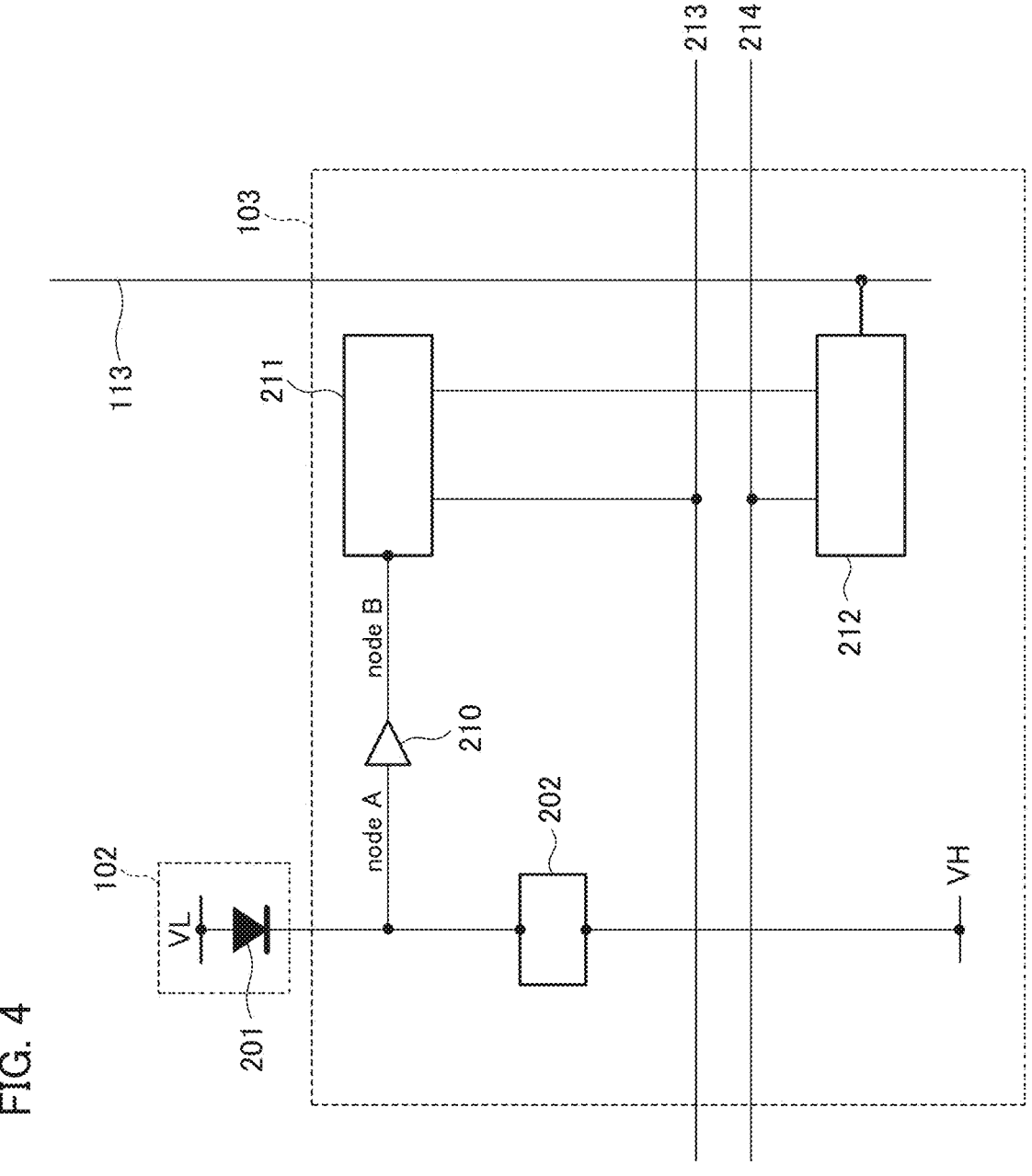
FIG. 4 is a diagram showing, from among FIG. 2 and FIG. 3, a photoelectric conversion unit 102 and an equivalent circuit for a signal processing circuit 103 for the photoelectric conversion unit 102.

FIG. 4 is diagram showing the photoelectric conversion unit 102 in FIG. 2 and FIG. 3, and an equivalent circuit of the signal processing circuit 103 for the photoelectric conversion unit 102. Note that a photoelectric conversion unit 102 and a signal processing circuit 103 are included in each pixel. The APDs 201 that are photoelectric conversion units 102 generate a charge pair according to input photons using photoelectric conversion.

One from among the two nodes of the APD 201 is connected to a power source line that provides a drive voltage VL (a first voltage). In addition, the other node from among the two nodes of the APD 201 is connected to a power source line that provides a drive voltage VH (a second voltage) that is higher than the voltage VL via a quenching element 202.

In FIG. 4, the one node of the APD 201 is an anode, and the other node of the APD is a cathode. The anode and the cathode of the APD 201 are supplied with a reverse bias voltage such that the APD 201 performs avalanche multiplication operations. By making this a state in which such a voltage has been supplied, the charge that is caused by photon incidence causes avalanche multiplication, and an avalanche current is generated.

Note that in a case in which a reverse bias current is supplied there is a Geiger mode in which the APD is made to operate at a voltage difference in which the voltage difference for the anode and the cathode is larger than the breakdown voltage, and a linear mode in which the APD is made to operate at a voltage difference in which the voltage difference for the anode and the cathode is in the vicinity of or less than the breakdown voltage. An APD that is made to operate in the Geiger mode is called a SPAD. In the case of a SPAD for example, the voltage VL (the first voltage) is made −30V and the voltage VH (the second voltage) is made 1V, and the like.

The signal processing circuit 103 has the quenching element 202, a waveform shaping unit 210, a counter 211, and a memory 212. The quenching element 202 is connected to the power source line that provides the drive voltage VH and one node from among the anode and the cathode of the APD 201.

The quenching element 202 functions as a load circuit (a quenching circuit) at the time of signal multiplication due to avalanche multiplication, and has an operation that controls the voltage supplied to the APD 201 and controls avalanche multiplication (a quenching operation). In addition, the quenching element 202 has an operation that returns the voltage that is supplied to the APD 201 to the drive voltage VH by flowing a current for the amount that was voltage dropped during the quenching operation (a recharging operation).

FIG. 4 shows an example in which the signal processing circuit 103 has the waveform shaping unit 210, the counter 211, and the memory 212 in addition to the quenching element 202. The waveform shaping unit 210 shapes the voltage changes of the cathode of the APD 201 that are obtained at the time of photon detection, and outputs a pulse signal.

For example, an inverter circuit can be used as the waveform shaping unit 210. In FIG. 4, although an example has been shown in which one inverter is used as the waveform shaping unit 210, a circuit in which a plurality of inverters has been serially connected may also be used, or another type of circuit having waveform shaping effects may also be used.

The counter 211 counts the number of pulses that have been output from the waveform shaping unit 210, and holds a count value. In addition, when a control pulse RES has been supplied via a drive line 213, the signal that has been held in the counter 211 is reset. In this context, the counter 211 generates a signal based on a difference between count values at a start time and an end time of an accumulation period.

The memory 212 is provided with a control pulse SEL from the vertical scanning circuit 110 of FIG. 3 via the drive line 213 of FIG. 4 (not shown in FIG. 3), and switches its electrical connection with the counter 211 and the vertical signal line 113 on and off. The memory 212 functions as a memory that temporarily stores a count value from the counter, and outputs an output signal from the counter 211 for a pixel to the vertical signal line 113.

Note that it may also be made such that a switch such as a transistor and the like is placed between the quenching element 202 and the APD 201 and between the photoelectric conversion unit 102 and the signal processing circuit 103, and the electrical connection is switched on and off. In the same manner, it may also be made such that a switch such as a transistor and the like is used to electrically switch the supply of the voltage VH or the voltage VL that are supplied to the photoelectric conversion unit 102 on and off.

Figure 5:
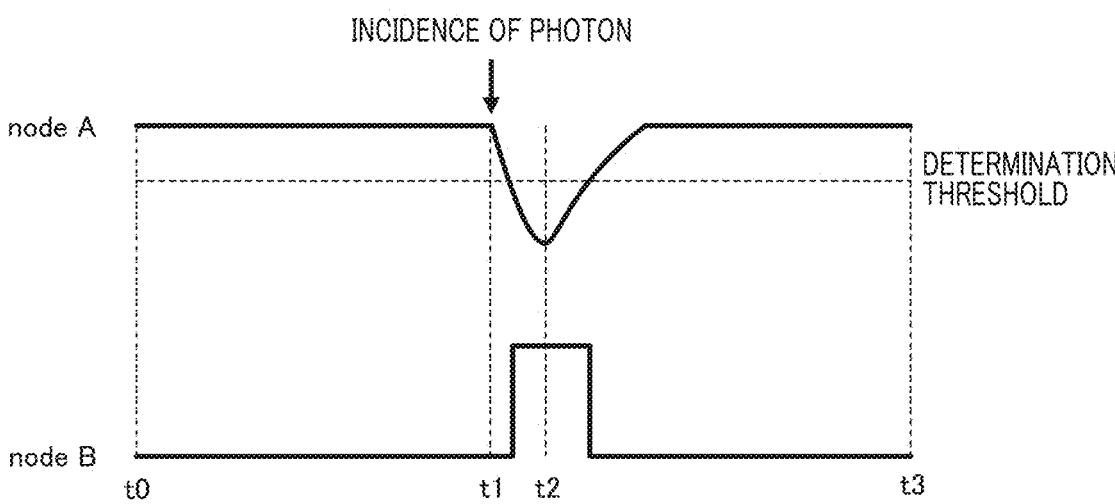
FIG. 5 is a diagram schematically showing the relationship between operations of an APD 201 and an output signal.

FIG. 5 is a diagram schematically showing the relationship between the operations and output signal of the APD 201. The input side of the waveform shaping unit 210 is made a nodeA, and the output side of the waveform shaping unit 210 is made a nodeB. During the period from the time to to the time t1, a potential difference of VH-VL is supplied to the APD 201. During the time t1, upon a photon becoming incident on the APD 201, avalanche multiplication occurs in the APD 201, an avalanche multiplication current is flowed through the quenching element 202, and the voltage of the nodeA is dropped.

Upon the voltage drop amount further increasing and the potential difference that is applied to the APD 201 decreasing, the avalanche multiplication of the APD 201 stops as during time t2, and it becomes such that the voltage level of the nodeA does not drop below a fixed value.

After this, during the period from the time t2 to the time t3, a current that compensates for the voltage drop amount from the voltage VL is flowed through the nodeA, and during the time t3, the nodeA becomes statically determinate at its original potential level. At this time, the portion of the output waveform that exceeds a certain threshold in the nodeA is waveform shaped by the waveform shaping unit 210 and output to serve as a pulse signal in the nodeB.

Figure 6:
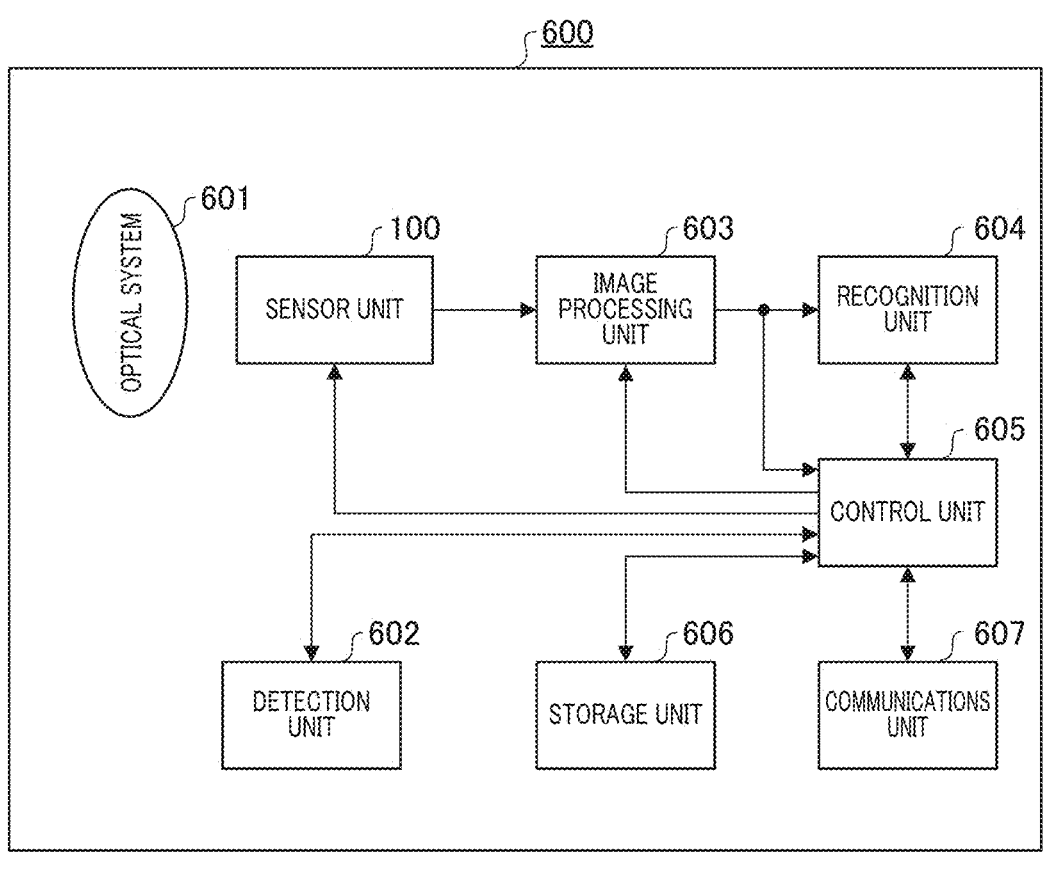
FIG. 6 is a functional block diagram showing a photoelectric conversion device 600 according to the First Embodiment.

Next, a photoelectric conversion device 600 of the First Embodiment will be explained. FIG. 6 is a functional block diagram of the photoelectric conversion device 600 according to the First Embodiment. Note that a portion of the functional blocks that are shown in FIG. 6 are realized by a computer program that has been stored on a memory serving as a storage medium that is not shown being executed by a computer that is included in the photoelectric conversion device 600 but that is also not shown.

However, it may also be made such that a portion or the entirety thereof is realized by hardware. As this hardware, an application specific integrated circuit (ASIC), a processor (a reconfigurable processor, a DSP), and the like can be used.

In addition each functional block that is shown in FIG. 6 does not need to be housed in the same body, and they may also be configured by separate devices that have been connected to each other via a signal path. Note that the explanation that is disclosed in relation to FIG. 6 also applies to the later FIG. 14.

The photoelectric conversion device 600 has the sensor unit 100 that was explained in FIG. 1 to FIG. 5, an optical system 601, a detection unit 602, an image processing unit 603, a recognition unit 604, a control unit 605, a storage unit 606, a communications unit 607, and the like. The sensor unit is configured by the avalanche photodiodes for photoelectrically converting an optical image that were explained in FIG. 1 to FIG. 5.

A camera unit consisting of a set of the optical system 601 and the sensor unit 100 is configured so as to, for example, capture images of at least one direction from among the front, the rear, and the side of the photoelectric conversion device 600.

In the present embodiment, the optical system 601 is a wide angle lens (for example, a fisheye lens) having an angle of view of, for example 120°, and forms an optical image of an object in front of the photoelectric conversion device 600 (a subject image) on an image capturing surface of the sensor unit 100. The detection unit 602 detects information relating to the surrounding environment of the photoelectric conversion device 600 (referred to below as environmental information). In addition, changes to the position and changes to the size of a region of interest and a region of non-interest to be described below are performed according to the output of the detection unit 602.

The image processing unit 603 performs image processing such as, for example, black level correction, gamma correction, noise reduction, digital gain adjustment, demosaic processing, data compression, and the like on an image signal that has been obtained from the sensor unit 100, and generates a final image signal. Note that in a case in which the sensor unit has an on-chip color filter such as RGB and the like, processing such as white balance correction, color conversion, and the like is performed in the image processing unit 603.

In addition the output of the image processing unit 603 is supplied to the recognition unit 604, and the control unit 605. The recognition unit 604 recognizes people, vehicles, objects and the like that have been image captured by performing image recognition based on the image signal. The recognition results of the recognition unit 604 are output to the control unit 605, and are reflected in changes to the control mode of the photoelectric conversion device 600, and the like. Furthermore, the recognition results are stored on the storage unit 606, and are externally transmitted via the communications unit 607 and the like.

The control unit 605 has a built in CPU that functions as a computer and a memory on which a computer program has been stored. In addition, the control unit 605 also functions as a setting means, and sets the length of the exposure period for each frame of the sensor unit 100, the control of the timing for a control signal CLK, and the like for each region via the control pulse generating unit 115 of the sensor unit 100.

Furthermore, the control unit 605 also functions as an acquisition means, and acquires sensor characteristic information such as the size, pixel number, and the like for the sensor unit 100, as well as the optical characteristic information such as the angle of view, the resolution, and the like of the optical system 601 to serve as the characteristic information for the photelectric conversion device 600. Furthermore, in addition to acquiring information such as the installation height, the installation angle, and the like that serves as the installation information for the photoelectric conversion device 600 from the detection unit 602, the control unit 605 also acquires the environmental information relating to the surrounding environment of the photoelectric conversion device 600 from the detection unit 602.

In addition, the control of each unit of the photoelectric conversion device 600 is performed by the CPU executing the computer program that has been stored on the memory that is built into the control unit 605 based on this information that has been acquired by the detection unit 602.

The storage unit 606 comprises a storage medium such as, for example, a memory card, a hard disk, and the like, and is able to store and read out an image signal. The communications unit 607 is provided with a wireless and wired interface, and outputs the image signal that has been generated to outside of the photoelectric conversion device 600 while also receiving each type of external signal.

The photoelectric conversion device 600 is used as, for example, a camera, a vehicle-mounted camera, a pet camera, a surveillance camera, a camera that performs detection and inspection that is used in a manufacturing line, a camera for use in distribution, and the like. In addition, this may also be applied to various usages, such as an endoscopic camera for medical purposes, a camera that detects a nursing care state, a camera for use in inspecting infrastructure, a camera for use in agriculture, and the like.

Figure 7:
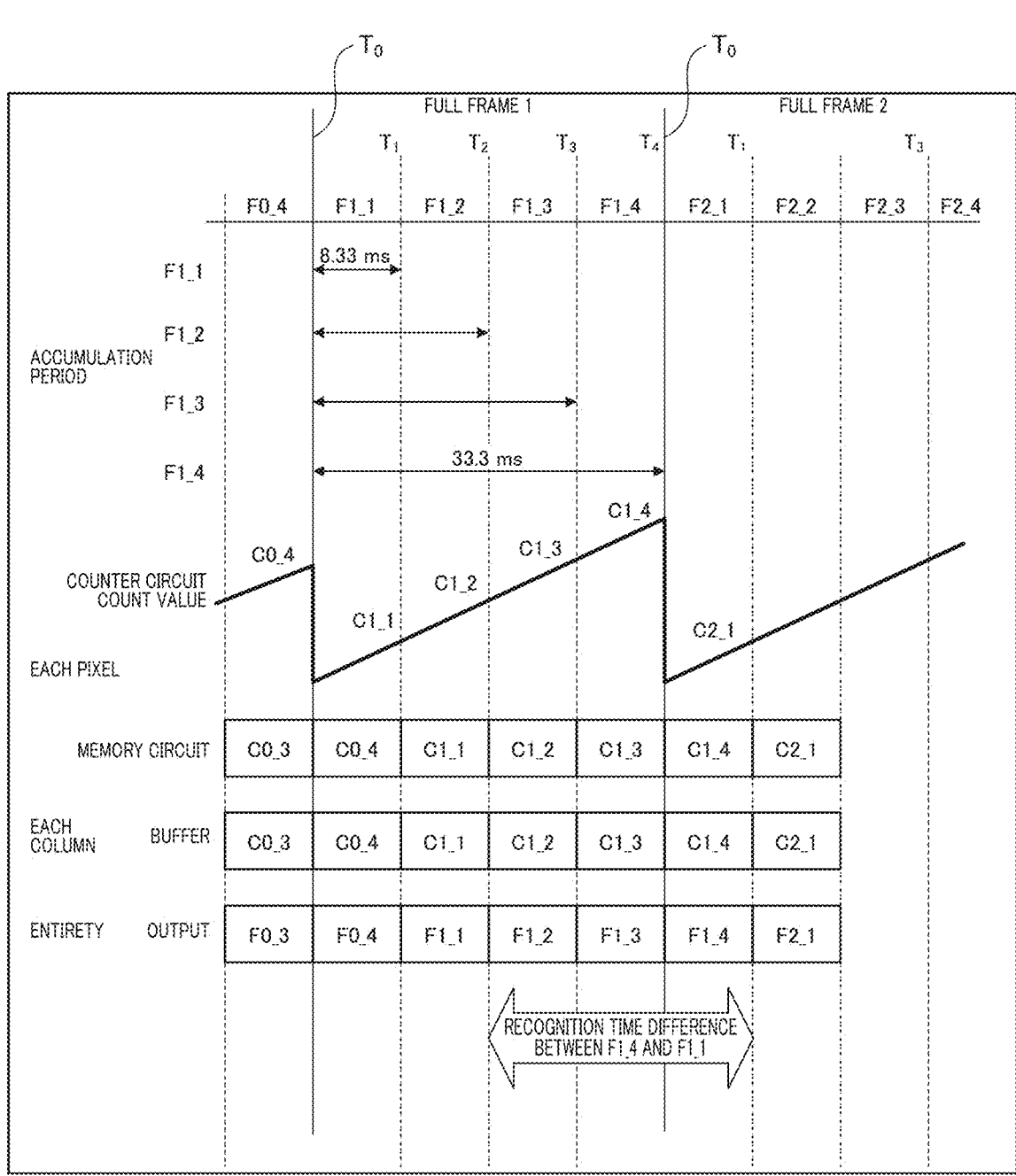
FIG. 7 is a diagram for explaining a photoelectric conversion method by a control unit 605 according to the First Embodiment.

FIG. 7 is a diagram for explaining a photoelectric conversion method by the control unit 605 according to the First Embodiment. In the present embodiment, for example, photoelectric conversion is periodically driven at a rate of 30 full frames per second. In addition, hereafter, a frame for one vertical period with a length of 33.3 ms is referred to as a full frame, and each segmented portion when a full frame has been segmented into four is referred to as a frame.

That is, as is shown in FIG. 7, a full frame 1 is segmented into the frame 1_1, the frame 1_2, the frame 1_3, and the frame 1_4, which are equal periods (8.33 ms). Note that after FIG. 7, there are cases in which frame is abbreviated as "F".

Note that the frame 1_1 has an accumulation period from the start time T0 until the time T1 of the full frame 1, and the frame 1_2 has an accumulation period from the time T0 until the time T2. In addition, the frame 1_3 has an accumulation period from the time T0 until the time T3, and the frame 1_4 has an accumulation period from the time T0 until the time T4.

In addition, during the time T1 to T4, each count value C1_1, C1_2, C1_3, and C1_4 is acquired from the counter 211. In addition, the count values C1_1, C1_2, C1_3, and C1_4 are temporarily held in the memory 212.

In addition, the signals for one row that have been temporarily held in the memory 212 are successively output from the sensor unit via the buffer of the read-out circuit 112. In addition, during the time T0, the counter 211 is reset. In this manner, according to the present embodiment, the signals that have been accumulated during the period for the frame 1_1 are readout over the time T1 to T2, and are rapidly processed by the recognition unit 604.

It is thereby possible to rapidly perform image recognition. In the same manner, the signals that have been accumulated during the periods for the frame 1_2, the frame 1_3, and the frame 1_4 are read out in order respectively over the time periods T2 to T3, T3 to T4, and T4 to T1, and it is possible to continuously perform image recognition. Note that the length of a full frame period is not limited to the example that has been described above. In addition, the segmentation number for the full frame period is not limited to 4.

Figure 8:
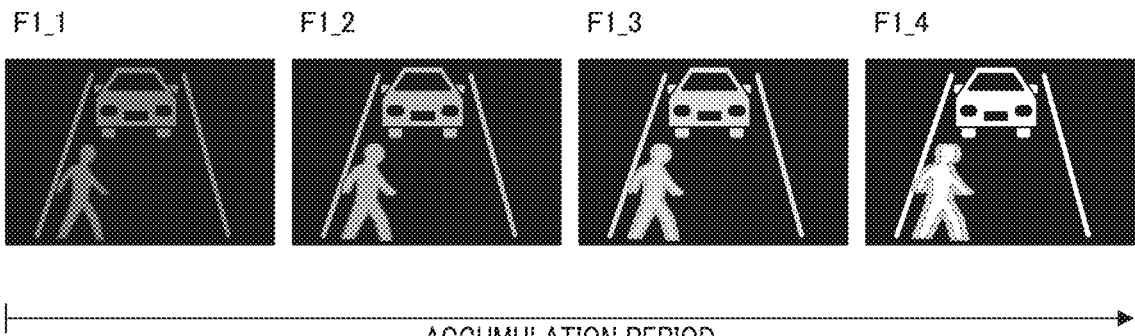
FIG. 8 is a diagram showing an example of an image with a plurality of accumulation periods that have been segmented according to the First Embodiment.

FIG. 8 is a diagram showing an example of images from a plurality of accumulation periods that have been segmented according to the First Embodiment. As is shown in FIG. 8, the image for the frame 1_1 has a short accumulation period and is therefore dark. However, there is little subject blur for the person who has suddenly appeared. In contrast, the accumulation periods become longer in order for the frame 1_2, the frame 1_3, and the frame 1_4, and therefore, it becomes easier for subject blur to occur. Note that it is difficult for blur to occur on a stopped vehicle or the white lines, and the longer the accumulation period, the easier it is to improve the contrast.

In this manner, in the present embodiment, there is a first accumulation period (for example, the time T1 to T2), and a second accumulation period (for example, the time T1 to T4) within one full frame period, and the first accumulation period is shorter than the second accumulation period. In addition, control is performed such that the signal that is generated during the first accumulation period is output during the time from the end of the first accumulation period until the end of the second accumulation period.

In addition, in the present embodiment, the first accumulation period and the second accumulation period overlap, and the first accumulation period and the second accumulation period start at the same time. Furthermore, the end time of the second accumulation period coincides with the end time of the full frame period, and the second accumulation period becomes an integer multiple of the first accumulation period.

However, it is not necessary for the second accumulation period to be an integer multiple of the first accumulation period. It is sufficient if the second accumulation period is longer than the first accumulation period (the first accumulation period is shorter than the second accumulation period), and the end of the second accumulation period comes after the end of the first accumulation period.

That is, an image for which the accumulation period is short and an image for which the accumulation period is long are made, the timing at which the short accumulation period ends is made faster than the timing at which the long accumulation period ends, and as soon as the short accumulation period ends, this image is output and sent to the recognition unit 604 to be describe below.

In addition, a subject is recognized based on at least a signal generated during the first accumulation period. The recognition unit 604 recognizes the subject based on at least the signal generated during the first accumulation period. Therefore, while in the prior art, image recognition could not be performed until one full frame period had elapsed, in the present embodiment, it is possible to perform image recognition after one quarter of a full frame period at the earliest.

Note that it is possible to improve the contrast the longer an accumulation period for an image is, and therefore, it is possible to use such an image as the image for use in display. That is, the image with a short accumulation period is suitable for rapid subject recognition, and the image for which the accumulation period is long is suitable as a display use image. Therefore, a display unit 703 of the present embodiment displays the image with the long accumulation period, that is, the signal that is generated during the second accumulation period, to serve as the image.

In addition, in the present embodiment an APD is used, and therefore, different than for a CMOS image sensor, the charge that has been accumulated is not deteriorated by being read out, and it is possible to overlap the accumulation periods. In addition, there is also no read-out noise, and therefore, the original signal will not deteriorate even if it is read out multiple times during one accumulation.

In contrast, although in a CMOS image sensor, it is possible to shorten the accumulation period by making the frame frequency faster, if the accumulation period is shortened, every time that this is shortened, the read out noise will increase and the signal to noise ratio for the output (S/N) will become worse. Therefore, it becomes difficult to acquire an image that is suitable for image recognition.

In addition, in a CMOS image sensor, in order to make the accumulation periods overlap, it is necessary to accumulate the same charge again in the pixel after it has been read out, and therefore, the circuits become complex, and the circuit scale becomes large. In addition, the noise also increases when a charge is accumulated in a pixel again, and therefore, the worsening of the S/N for the output becomes large, and it becomes difficult to acquire an image that is suitable for image recognition.

Figure 9:
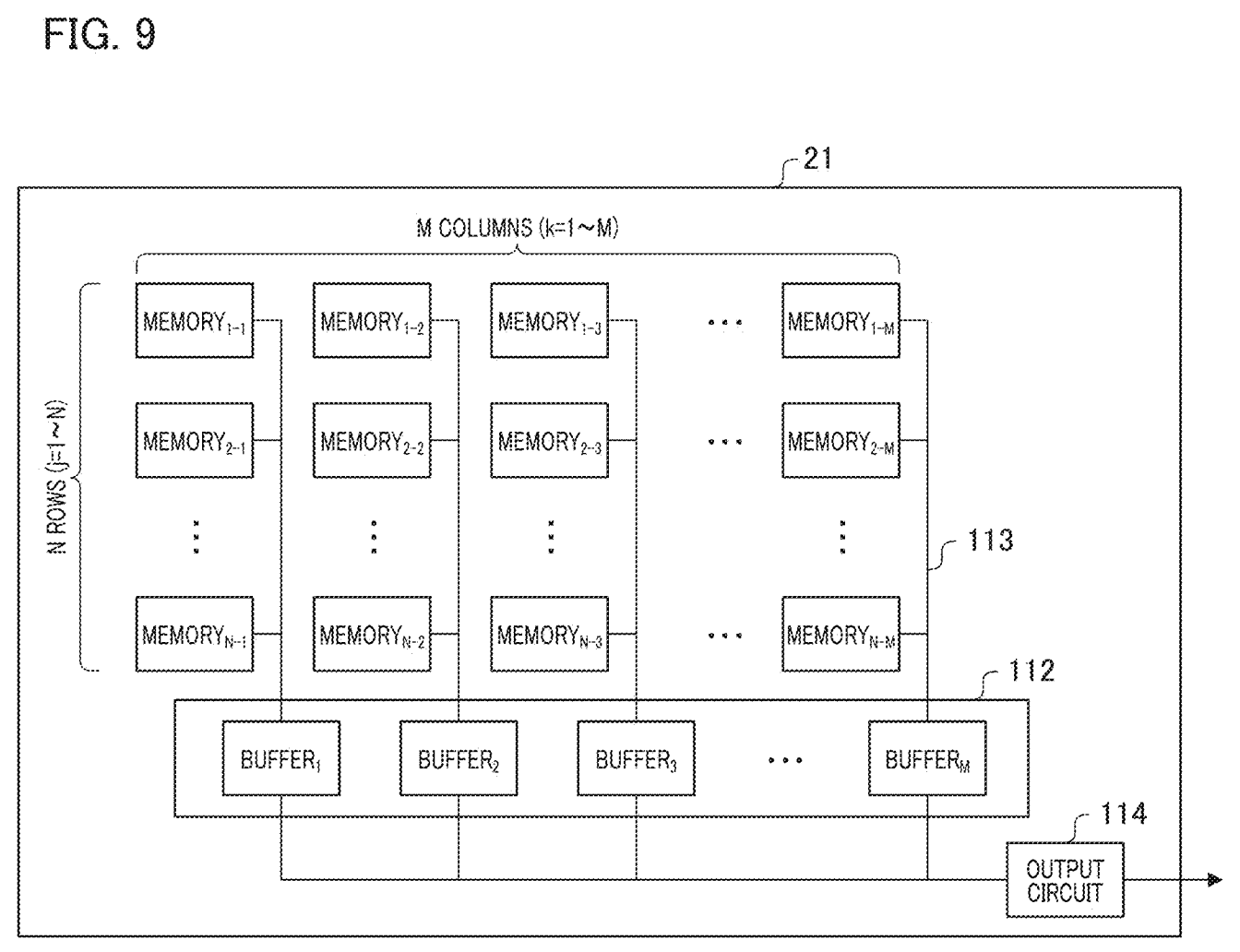

FIG. 9 is a diagram showing the relationship between memories and buffers in the First Embodiment. FIG. 9 shows a state in which the memories 212 have been arranged in an array of N rows and M columns inside of the signal processing circuit 103 of FIG. 3, and each memory 212 is represented such that there is a memory 1-1 to a memory N-M. In addition, the buffer 1 to the buffer M in FIG. 9 show the buffers that are included in the read-out circuit 112 of FIG. 3. The output circuit 114 in FIG. 9 corresponds to the output circuit 114 of FIG. 3

Figure 10:
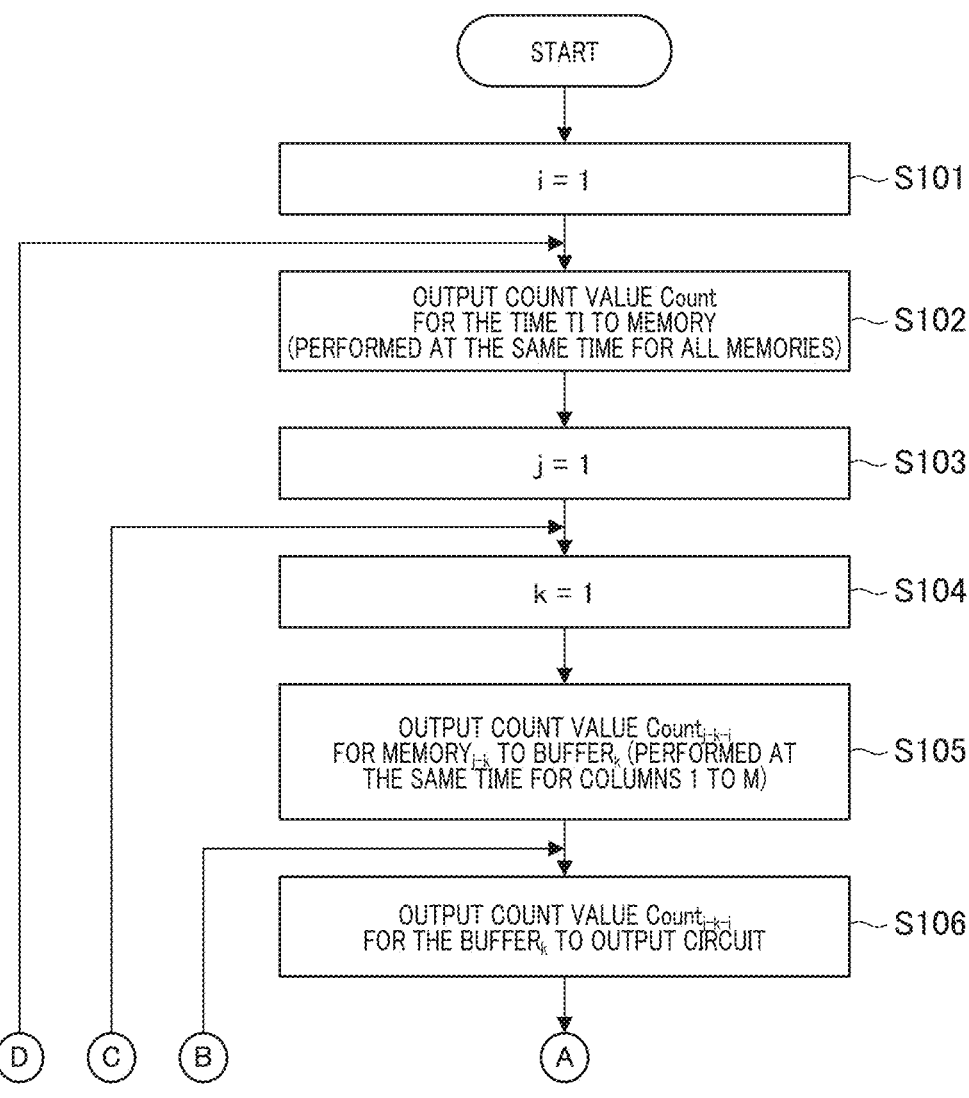
FIG. 10 is a flowchart showing details of a drive example of the sensor unit 100 in the First Embodiment.
Figure 11:
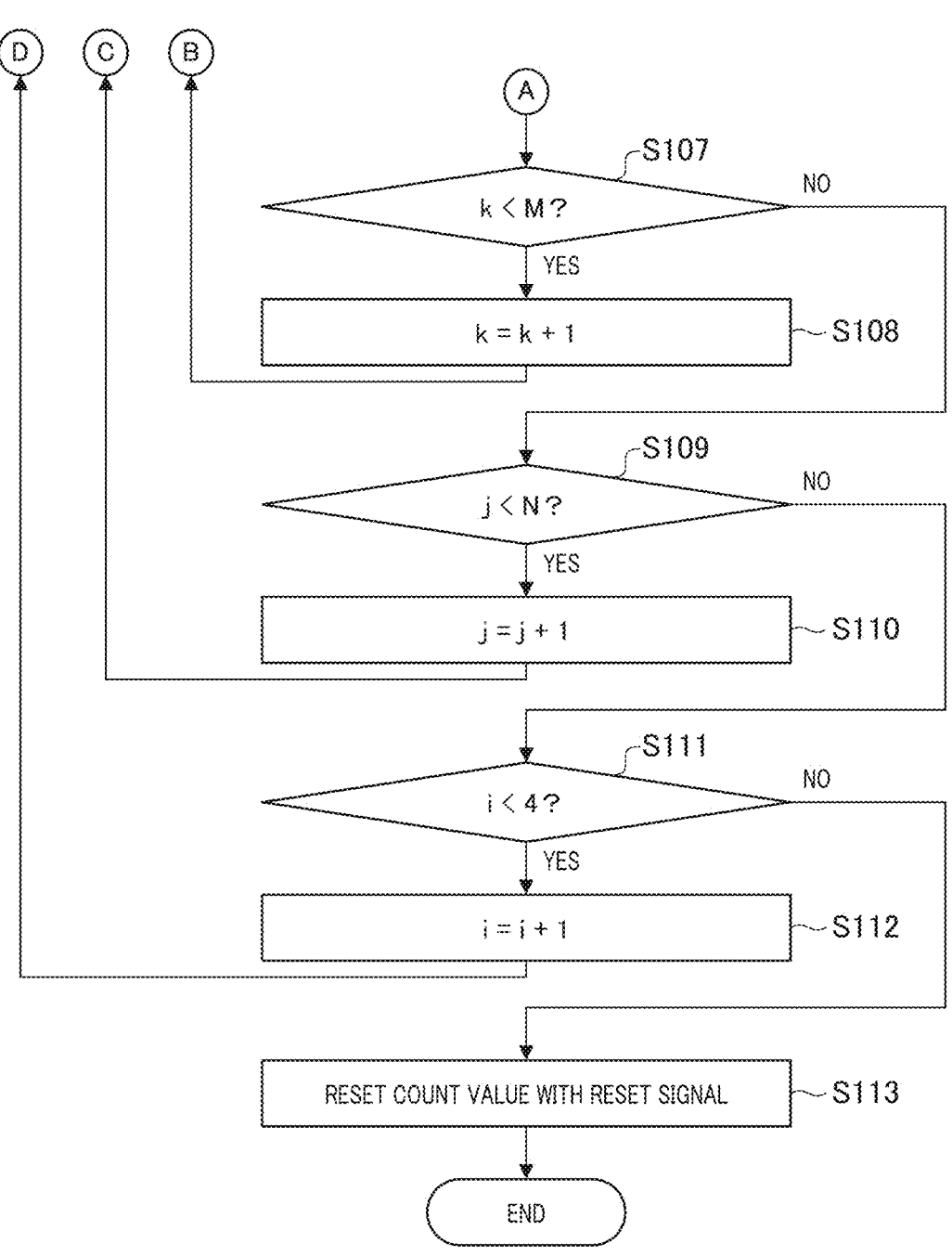
FIG. 11 is flowchart that is a continuation of FIG. 10.

FIG. 10 is a flowchart showing the details of a drive example for the sensor unit 100 in the First Embodiment, and FIG. 11 is a flowchart that is a continuation of FIG. 10. Note that the operations for each step of the flowcharts in FIG. 10 and FIG. 11 are performed in order by the CPU that serves as a computer inside of the control unit 605 executing the computer program that has been stored on the memory.

During step S101 of FIG. 10, the CPU of the control unit 605 sets i=1. Next, during step S102, the CPU of the control unit 605 outputs the count value Count from the counter 211 for the time Ti to the memory 212. At this time, output is performed at the same time for each memory. This operation corresponds to the operation for the time T1 from FIG. 7

Next, during step S103, the CPU of the control unit 605 sets j=1. Next, during step S104, the CPU of the control unit 605 sets k=1. During step S105, the CPU of the control unit 605 outputs the count value Count (j–k–i) for the memory j–k of FIG. 9 to the buffer. At this time, the columns 1 to M are output to the buffers at the same time. This operations means an operation in which the count values for the first row in FIG. 9 are taken into the buffers.

During step S106, the CPU for the control unit 605 outputs the count value Count (j–k–i) for the buffer k to the output circuit 114. This operation corresponds to an operation in which the signals for the buffers of the leftmost column in FIG. 9 is read out from the output circuit.

Next, the processing proceeds to step S107 of FIG. 11 via A, and during step S107, the CPU of the control unit 605 determines if k<M. If this is Yes during step S107, during step S108, k is increased by 1 by making this k=k+1, the processing returns to step S106 via B, and the operation for step S106 is performed, This operation corresponds to an operation in which the signals for the buffers for the second column from the left in FIG. 9 are read out from the output circuit.

In the case of No during step S107, that is, in a case in which k=M, this means that the read out of the signal for the buffer for the $M^{th}$ column of FIG. 9 from the read-out circuit has been completed, the processing then proceeds to step S109, and the CPU of the control unit 605 determines if j<N. In the case of Yes during step S109, during step S110, the CPU of the control unit 605 increases j by 1 by making this j=J+1, and the processing returns to step S104 via C. This corresponds to an operation for beginning the readout of the next row.

In a case in which No has been determined during step S109, this means that the readout has been completed for all of the rows, and therefore, the processing proceeds to step S111, and the CPU of the control unit 605 determines whether or not i<4. In the case in which Yes has been determined during step S111, during step S112, the CPU for the control unit 605 increases i by 1 by making this i=i+1, and the processing thereby returns to step S102 via D. This operation corresponds to an operation that begins the read-out for the next time T2.

In a case in which No has been determined during step S111, this means that the read out for the time T4 has been completed, and therefore, the processing proceeds to step S113, and the CPU for the control unit 605 resets the counter 211 using a reset signal. This operation corresponds to an operation that resets the counter 211 for the time T4 in FIG. 7. Note that the processing flow in FIG. 10 and FIG. 11 is cyclically repeated. In the above-described manner, it is possible to read out the signals that have been accumulated in the sensor unit in order.

In the sensor unit, in a case in which there is a circuit configuration such as that in FIG. 9, it becomes possible to change the settings for the accumulation periods for each column.

For example, in the first column (k=1), as is shown in FIG. 7, the time period for the full frame 1 is changed into the accumulation periods for the frame 1_1, the frame 1_2, the frame 1_3, and the frame 1_4, and four pieces of data are read out That is, the first column is set as a first image region for which the accumulation period is short.

In contrast, during the second column (K=2), it also becomes possible to split the period for the full frame 1 into two, and to read out only the two pieces of data for the accumulation periods for the frame 1_2 and the frame 1_4. That is, the second column is set as the second image region for which the accumulation period is long.

In this manner, according to the present embodiment, it is possible to arbitrarily change the accumulation periods and the number of accumulation periods, and by changing the accumulation periods and the number of accumulation periods, it becomes possible to change the strength of the signal that is accumulated and to increase or decrease the number of times that accumulation is performed. In addition, it becomes possible to increase or decrease the amount of data according to the number of times that accumulation is performed. However, if the data amount increases, the energy consumption of the sensor unit and the photoelectric conversion device 600 will also increase in accordance with this.

The change to the settings for the accumulation period is not limited to the method of changing this per each column, and by changing the signal line of the sensor unit 100, it is also possible to change the settings for the accumulation periods for each row, or to change the settings for the accumulation periods for each pixel. These settings for the accumulation period per region or per pixel are performed by the control unit 605.

As has been explained above, the control unit 605 has a built in CPU that serves as a computer and a built in memory on which a computer program has been stored, and acquires information from the detection unit 602, then the CPU executes the computer program that has been stored on the memory based thereon. It this thereby possible to perform the settings for the accumulation periods per region or pixel.

In this manner, the accumulation periods are set per region or pixel of the sensor unit 100 by the control unit 605, and it is possible to make the timing at which the short accumulation period ends faster than the timing at which the long accumulation period ends. Therefore, as soon as the short accumulation period ends it becomes possible to output the image therefrom and to send this to the recognition unit 604 that will be described below.

That is, it becomes possible for the recognition unit 604 to perform subject recognition within an image region for which the accumulation period is short during the time T1 at which the frame 1_1 ends, which is a timing that is faster than the time T4 at which the full frame 1 ends in the first column (k=1) based on the signal that is generated during the accumulation time period. Therefore, although in the prior art it was not possible to perform image recognition until one full frame time period had elapsed, in the present embodiment, it becomes possible to set a region in which image recognition can be performed at a shorter time.

In addition, it becomes possible to acquire images during a plurality of accumulation periods, and therefore, it becomes possible to generate images with appropriate exposures for both bright regions and dark regions. It is thereby possible to make the signal to noise ratio (S/N) for each region as large as possible. That is, in a dark region, the signal is increased by a long accumulation time period, and the S/N is made as large as possible.

In contrast, in a bright region, it is possible to acquire a signal without saturating the signal by using a short accumulation period, and the S/N can be made as large as possible. Thus, by applying an accumulation time period that is suitable for each region, it becomes possible to acquire an image in which the S/N has been made as large as possible for each region without saturating the signal while also inhibiting noise.

In addition, by applying an accumulation time period that is suitable to each region, it is possible to suppress blur on moving subjects. During the long accumulation time period, there is a possibility that an image with subject blur will occur. In contrast, during the short accumulation period, it is possible to decrease subject blur. Therefore, by applying an appropriate accumulation period, it becomes possible to acquire an image in which the blur for moving subjects has been decreased.

Figure 12:
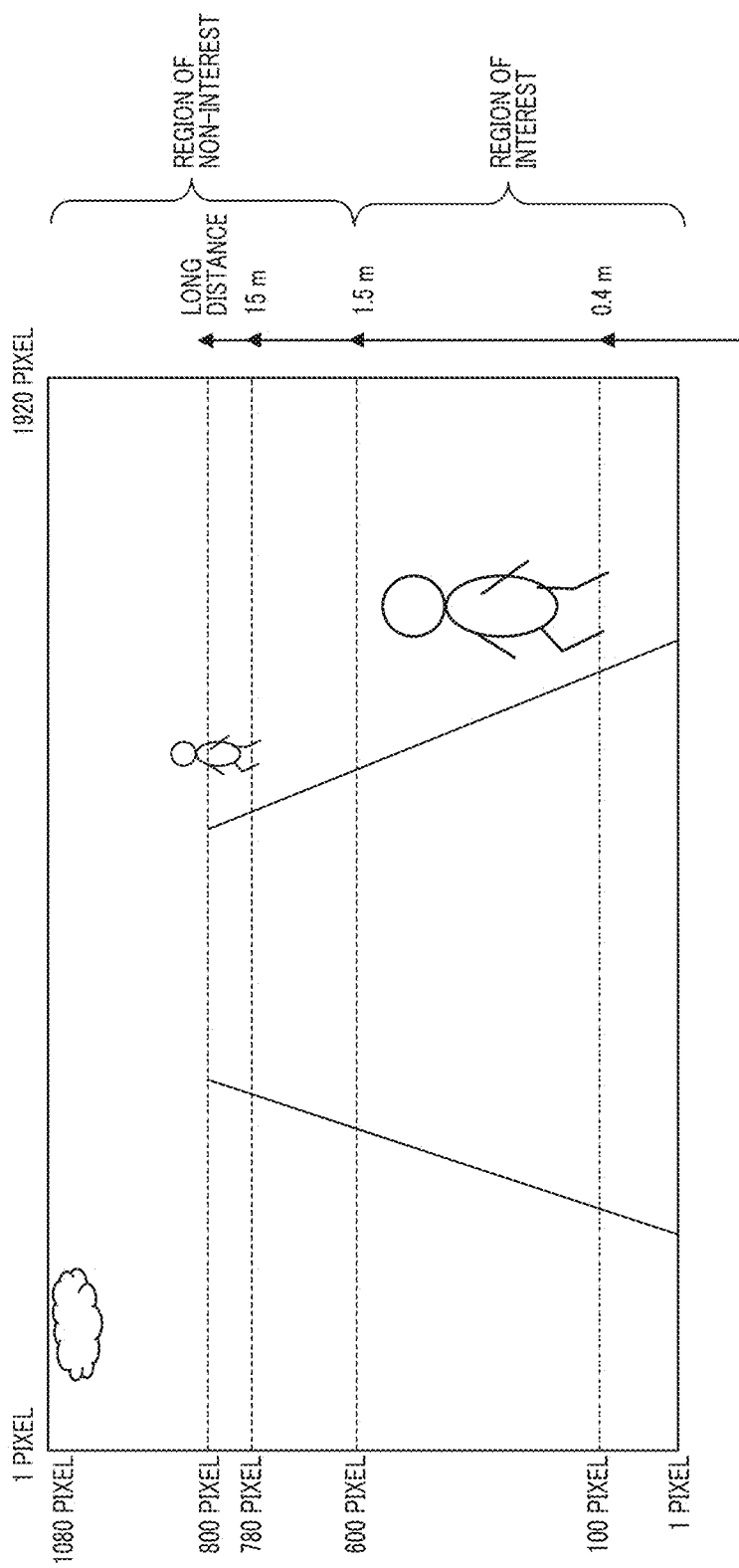
FIG. 12 is a diagram explaining an example of setting a region of interest in the First Embodiment.

Next, an example of a method for setting a region of interest will be explained using FIG. 12. FIG. 12 is a diagram explaining an example of setting a region of interest in the First Embodiment. In the First Embodiment, the region of interest is set by performing segmentation in the column direction of FIG. 9.

In FIG. 12, an example of an image that has been captured with the photoelectric conversion device 600 is shown. In this photoelectric conversion device 600, the left to right angle of view for the optical system 601 is 120 degrees, the up down angle of view is 30 degrees, and the number of pixels for the sensor unit 100 is made 1920 pixels in the M column direction, and 1080 pixels in the N row direction.

In addition, the photoelectric conversion device 600 is installed such that the installation height is 100 mm from the ground, and the installation angle is an angle such that a vanishing point that is separated by an infinite distance becomes 800 pixels from the bottom in the pixels in the N row direction of the sensor unit 100. In addition, the upper side of the N row direction of the sensor unit 100 acquires a long-distance image, and the lower side acquires a short distance image.

More specifically, the position of the $100^{th}$ pixel from the bottom captures images of an object that exists at a position about 0.4 m in front of the photoelectric conversion device 600, and the position of the $600^{th}$ pixel from the bottom captures images of an object that exists about 1.5 m in front of the photoelectric conversion device 600. In addition, the position of the $780^{th}$ pixel from the bottom captures images of an object that exists at a position about 15 m in front of the photoelectric conversion device 600.

In a case in which a subject has moved in the M column direction, the shorter that the distance is, the larger that the number of pixels moved will become in comparison to when this is a long distance, and therefore, if image capturing is performed with a long accumulation period, there will be the problem that the subject will protrude from the image capturing region of the photoelectric conversion device 600, and the images of the subject that have been captured will be blurry.

Therefore, in the present embodiment, the short distance region is made the region of interest and set as the first pixel region, and an image with an accumulation period that is shorter than that for a full frame period is acquired. It is thereby possible to capture images of a moving subject inside of the image capturing region, and it becomes possible to inhibit image blur for the subject. Note that the first pixel region has at least a first accumulation period and a second accumulation period.

In contrast, in the second pixel region, which is the long distance region, even if the subject moves in the M column direction at the same velocity, the number of pixels moved will be small in comparison to that for a short distance, and therefore, it is possible to capture images of the subject inside of the image capturing region of the photoelectric conversion device 600, and the image blur for this subject that has been image captured becomes small.

Therefore, even if an image is acquired that has an accumulation period that is shorter than a full frame period, the data for which there are few changes, so-called unnecessary data, will increase. Therefore, in the present embodiment, in the second pixel region, by making the accumulation period the second accumulation period that is longer than the first accumulation period, it becomes possible to decrease the amount of data while also making it possible to inhibit the energy consumption of the photoelectric conversion device 600. That is, the second pixel region has at least the second accumulation period.

Specifically, in the present embodiment, the range below, for example, the $600^{th}$ pixel from the bottom in the column direction is set as the first pixel region to serve as the region of interest. In addition, the range above the $601^{th}$ pixel from the bottom in the column direction is set as the second pixel region to serve as the region of non-interest.

In addition, image capturing is performed in the first pixel region during an accumulation period in which one full frame period with a length of 33.3 ms has been segmented into four, and image capturing is performed in the second pixel region during an accumulation period in which the one full frame period with a length of 33.3 ms is left as is and is not segmented.

In this context, in a case in which a subject at a position that is approximately 1.5 m away from the photoelectric conversion device 600 has moved in the M column direction at a speed of 4 km per hour, if image capturing is performed during the accumulation period of 33.3 ms, this will become an image in which about 14 pixels have become blurred. In contrast, in the case of the accumulation period that has been segmented into four, if image capturing is performed during the shortest accumulation period, which is 8.33 ms, this will become an image in which only about 3 pixels have become blurred, and it becomes possible to acquire a clear image.

In contrast, in a case in which a subject at a position that is about 15 m away from the photoelectric conversion device 600 has moved in the M column direction at a speed of 4 km per hour, if image capturing is performed during the accumulation period of 33.3 ms, this will become an image in which the movement due to the movement of the subject is contained in the angle of view for one pixel.

Therefore, in a case in which the accumulation has been segmented into four as well, even if image capturing is performed during the shortest accumulation period of 8.33 ms, this will naturally be an image in which the movement due to the movement of the subject is contained in the angle of view for one pixel, and in addition, this will become an image with no blur, and it becomes possible to acquire a clear image.

Therefore, even if the accumulation period is changed, the blur for the image of the subject will not change, and only the brightness will be different, making it such that four almost identical images will be captured, and the amount of data will increase. That is, there is a high possibility that acquiring a plurality of images with different accumulation times in a position that is a long distance away from the photoelectric conversion device 600 will result in an increase in unnecessary data.

In this manner, in the present embodiment, the first pixel region and the second pixel region are appropriately set based on the device information and the installation information for the photoelectric conversion device 600, and image capturing is performed with different accumulation periods for each region. It thereby becomes possible to decrease the amount of data and the energy consumption while also decreasing the blur in the pixels due to the subject moving.

Second Embodiment

Figure 13:
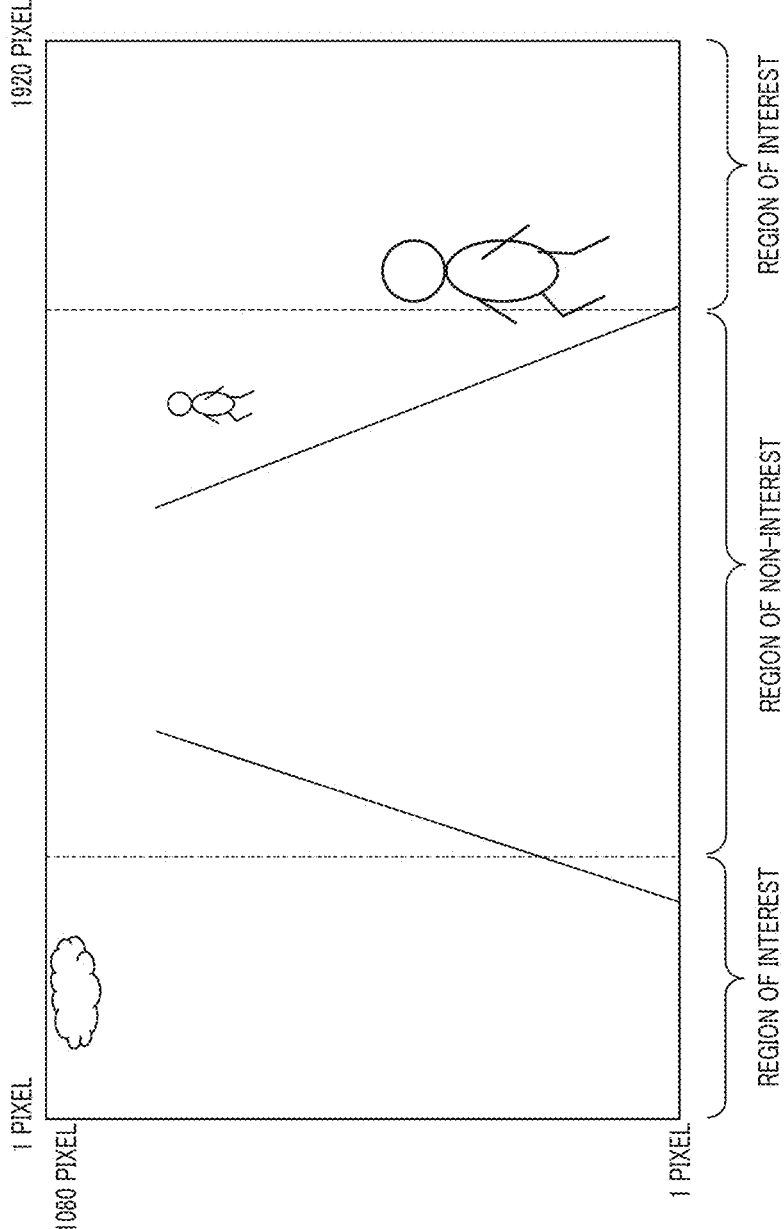
FIG. 13 is a diagram explaining an example of setting a region of interest in a Second Embodiment.

Next, an example of setting the region of interest by performing segmentation in the row direction of FIG. 9 in the Second Embodiment will be explained. FIG. 13 is a diagram explaining an example of setting the region of interest in the Second Embodiment.

For example, as is shown in FIG. 13, the right to left angle of view for the optical system 601 of the photoelectric conversion device 600 is made 120 degrees, the up down angle of view is made 30 degrees, and the number of pixels for the sensor unit 100 is made 1920 pixels in the M column direction, and 1080 pixels in the N row direction.

In addition, the photoelectric conversion device is installed such that the installation height is made 100 mm, and the installation angle of view becomes an angle such that the vanishing point that is separated by an infinite distance becomes the $800^{th}$ pixel from the bottom in the pixels in the N row direction of the sensor unit 100. Note that the left side and the right side of the M column direction of the sensor unit 100 acquire images of the left side and the right side respectively of the angle of view of the photoelectric conversion device 600.

In addition, in the present embodiment, the region of interest is made the left to right edge side of the angle of view and this is set as the first pixel region, and an image is acquired for the accumulation period (the first accumulation period) that is shorter than the full frame period. It is thereby possible to decrease circumstances in which the subject leaves the image capturing region and image capturing cannot be performed for cases in which the subject has moved.

In addition, in cases in which a subject that has entered the image capturing region from outside of the image capturing region is recognized and is tracked and image captured as a target, it becomes possible to more quickly image capture, recognize, and record a subject who has entered from the left to right edge.

In contrast, it is possible to capture images of the subject within the image capturing region even if the subject has moved in the second pixel region, which is the range in the center of the angle of view. In addition, there are cases in which a subject has already been recognized, and therefore, even if images are acquired for the accumulation period that is shorter than the full frame period, the amount of unnecessary data will increase.

Therefore, in the present embodiment, by acquiring images during a second accumulation period that is longer than the first accumulation period in the second pixel region, it is possible to decrease the amount of data, and it is also possible to inhibit the energy consumption of the photoelectric conversion device 600.

Third Embodiment

Next, as the Third Embodiment, an example will be explained in which in a case in which the photoelectric conversion device 600 is used after being attached to a movable apparatus 700, a traffic participant target is recognized, and the region of interest is set based on these recognition results. In the present embodiment, a traffic participant target indicates a person or movable apparatus on a road such as, for example, a pedestrian, a motorbike, a bicycle, and the like that is in the surroundings of the movable apparatus.

Figure 14:
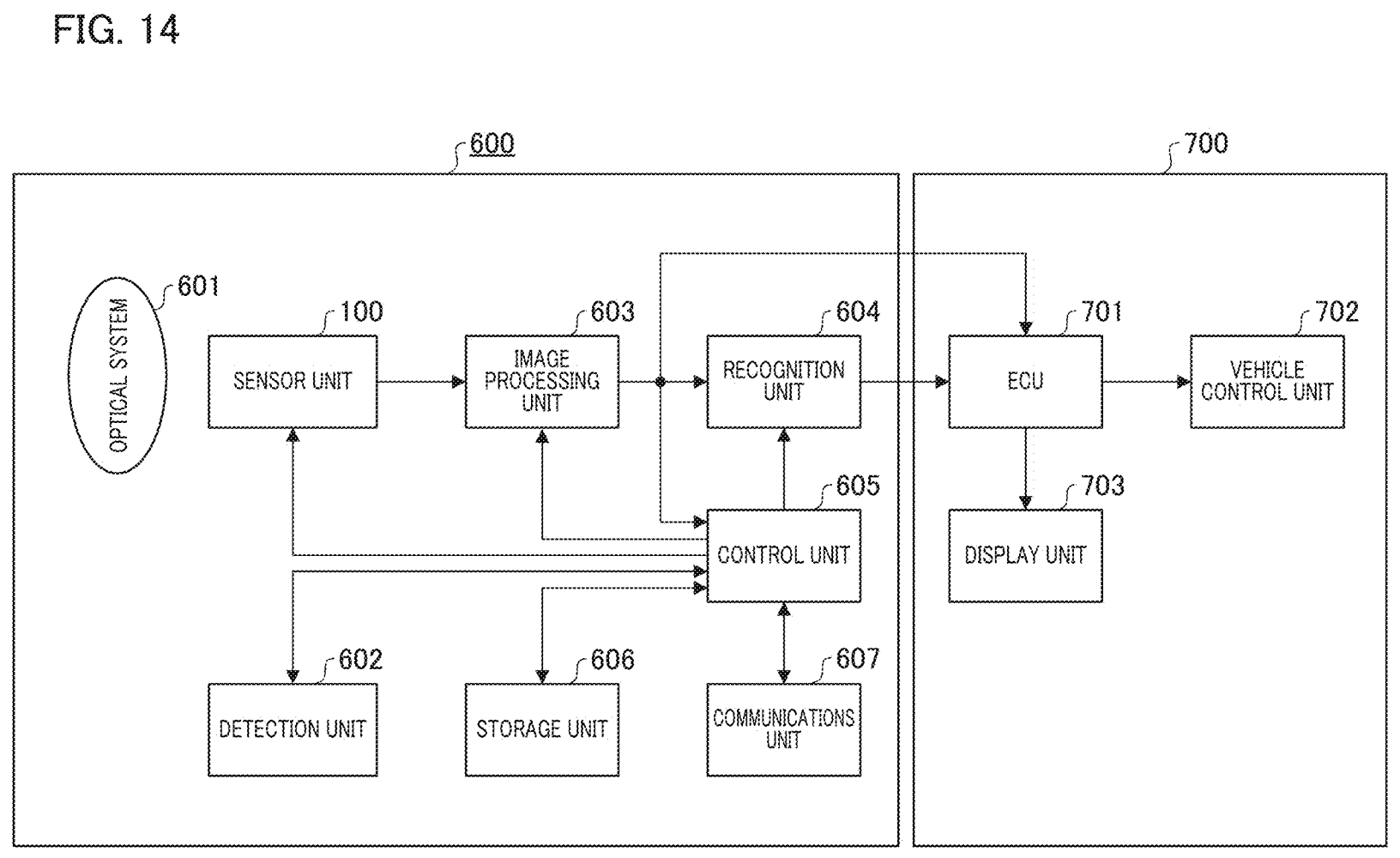

FIG. 14 is a functional block diagram showing a configurational example of the photoelectric conversion device 600 and the movable apparatus 700 according to the Third Embodiment. The photoelectric conversion device 600 of the Third Embodiment is built into the movable apparatus 700, and sets the region of interest based on at least one of the position, the velocity, the movement direction, the distance, and the like of a person, vehicle, and the like that is the traffic participant target. Note that in FIG. 14, configurational blocks that have the same reference numerals as the configurational blocks in FIG. 6 are the same, and therefore explanations thereof will be omitted.

In the Third Embodiment, the output of the image processing unit 603 is provided to the recognition unit 604, the control unit 605, and an ECU (electronic control unit) 701 that serves a movement control unit of the movable apparatus 700. The recognition unit 604 recognizes people, vehicles, objects, and the like in the surroundings by performing image recognition based on the image signal, and outputs the recognition results to the ECU 701.

In addition, the control unit 605 acquires information such as the installation height, the installation angle, and the like as the installation information for the photoelectric conversion device 600 on the movable apparatus 700 from the ECU 701. Furthermore, the control unit 605 acquires the environmental information for the photoelectric conversion device 600 from the detection unit 602, while also acquiring the information and the environmental information for the movable apparatus 700 from the ECU 701.

The information for the movable apparatus that is acquired by the ECU 701 includes at least one of vehicle speed information, acceleration information, handle operation angle information, brake information, engine information, and the like. In addition, the environmental information includes at least one of information such as the presence or absence, position, speed, acceleration, distance, and the like of the traffic participant target (a pedestrian, motorbike, bicycle, and the like in the surroundings of the movable apparatus), map information, GPS information, the state of the road, the condition of the road surface, weather information, the brightness of the surroundings, the time, and the like.

In addition, the control of each unit of the photoelectric conversion device 600 is performed by the CPU executing the computer program that has been stored on the memory that is built into the control unit 605 based on this information that has been acquired.

The ECU 701 has a built in CPU that serves as a computer and a built in memory on which a computer program has been stored, and control is performed for each unit of the movable apparatus 700 by the CPU executing the computer program that has been stored on the memory.

The output of the ECU 701 is also supplied to a vehicle control unit 702 and the display unit 703. The vehicle control unit 702 functions as a travel control unit that performs operations such as the drive, stopping, directional control, and the like of a vehicle that serves as the movable apparatus based on outputs from the ECU 701.

In addition, the display unit 703 includes, for example, display elements such as a liquid crystal display, an organic EL, and the like, and is built into the movable apparatus 700. The display unit 703 displays the images that have been acquired by the sensor unit, and each type of information relating to the travel state and the like of the vehicle to an operator of the movable apparatus 700 by using, for example, a GUI, based on the outputs from the ECU 701.

Note that the image processing unit 603, the recognition unit 604, and the like in FIG. 14 do not need to be built into the movable apparatus 700. For example, an external terminal or an external server and the like that have been provided separately from the movable apparatus 700 in order to remotely control the movable apparatus 700 and to monitor the travel of the movable apparatus may also be provided.

Figure 15:
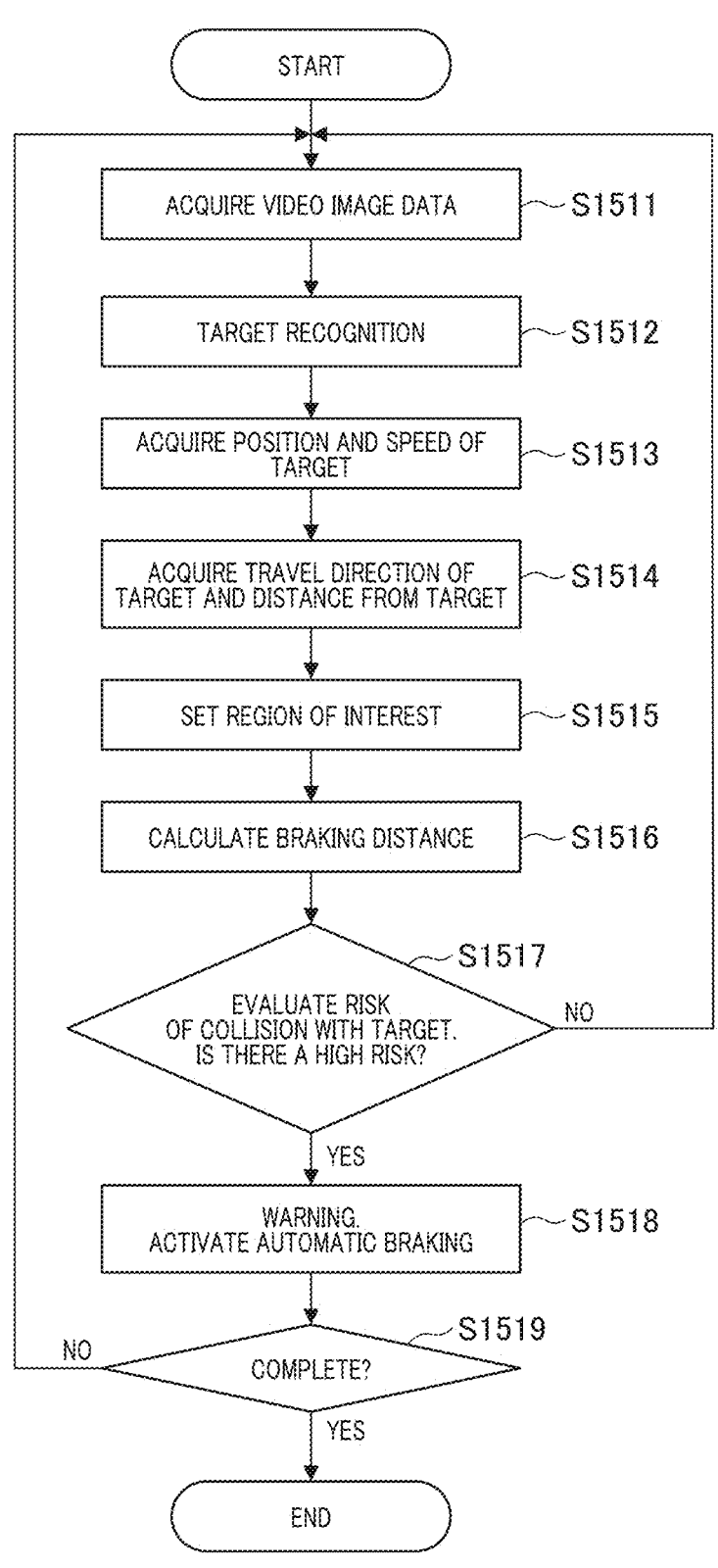
FIG. 15 is a flowchart explaining a control method for a movable apparatus according to a Third Embodiment.

FIG. 15 is a flowchart explaining a control method for the movable apparatus according to the Third Embodiment, Note that the operations for each step of the flowchart in FIG. 15 are performed in order by the CPUs that serve as computers inside of the control unit 605 and the ECU 701 executing the computer programs that have been stored on the memories.

First, during step S1511, the CPU of the control unit 605 acquires video image data from the photoelectric conversion device 600 while driving is being performed. Next, during step S1512, the CPU of the control unit 605 performs image recognition based on the signal that has been read out from the pixel region for the sensor unit 100 of the photoelectric conversion device 600, and thereby recognizes the target, which is the traffic participant target.

In addition, during step S1513, the CPU of the control unit 605 acquires the position and speed of the traffic participant target and the like that serves as the subject that has been recognized. This may also be acquired by using changes to the target in the video image data for a plurality of full frames, or millimeter wave radar, or LiDAR (light detection and ranging) that serve as a separate distance measurement device.

Next, during step S1514, the CPU of the ECU 701 acquires the travel direction of the target that is the traffic participant target, and the distance from the target. The same as in the previous case, this may also be acquired by using changes in the target in the video image data for a plurality of full frames, or millimeter wave radar or LiDAR that serve as a separate measurement device.

In addition, during step S1515, the CPU of the ECU 701 sets the region of interest based on at least one of the position, the speed, the travel direction, the distance, and the like of the target that is the traffic participant target and the like. Next, during step S1516, the braking distance of the automobile is calculated.

Note that in relation to the braking distance, this is not limited to the speed of the movable apparatus 700, and the breaking distance may also change due to an angle of incline of a road surface, the state of the rode surface (if it is asphalt, dirt, gravel, if there is rain or snow, if it has frozen over, and the like), the degree of consumption of the tires (the characteristics, usage distance, and the like of the tires themselves), the weight of the movable apparatus 700, and the like. Therefore, this may also be determined by comprehensively using all of this information.

Next, during step S1517, the CPU of the ECU 701 performs an evaluation of the risk of collision with the target that is the traffic participant target. At this time, the evaluation is performed taking into consideration elements such as the speed, the travel direction, the distance, and the like of the target that is the traffic participant target. In addition, during step S1517, in a case in which it has been determined that the risk of collision is higher than a predetermined value, during step S1518, the CPU of the ECU 701 generates a warning signal, and a warning is conveyed to the operator via the display unit 703 and audio. Furthermore, an automatic braking system will be activated according to necessity.

In addition, it a case in which it was determined during step S1517 that the risk of collision was less than the predetermined value, the processing returns to step S1511, and the video image data for the next full frame is acquired.

After step S1518, the processing proceeds to step S1519, and the CPU of the ECU 701 identifies if the power source for the movable apparatus has been turned off by the user or if an operation has been performed to end the processing flow in FIG. 15. In the case of Yes during step S1519, the processing flow for FIG. 15 is completed. In the case of No during step S1519, the processing returns to step S1511, and the processing flow for FIG. 15 is repeated.

In this manner, by making the surroundings of the traffic participant target the region of interest and setting this as the first pixel region, then acquiring images during a first accumulation period that is shorter than a full frame period, it is possible to acquire images for which the S/N for the movable apparatus is high and there is little blur due to movement.

Furthermore, by acquiring such images, it becomes possible to perform recognition with a high degree of procession in cases in which a traffic participant target is recognized and tracking image capturing is performed with the traffic participant target serving as the image capturing target, and the like. In addition, it is possible to realize a collision prevention system in which in cases in which there is a high risk of collision between the movable apparatus 700 and the traffic participant target, a warning signal is generated, a warning is conveyed to the operator via the display unit 703 and audio, and furthermore, an automatic braking system and the like is activated according to necessity.

In contrast, there are many cases in which it is sufficient if the regions other than the surrounding regions of the traffic participant target are image captured as background images, and images with a high S/N and little blur are not necessary. Therefore, by making these regions the regions of non-interest and setting them as the second pixel regions, then acquiring images during the second accumulation period that is longer than the first accumulation period during the full frame period, it becomes possible to decrease the amount of data for the captured images.

In this manner, in the Third Embodiment, the traffic participant target is recognized based on images that have been captured and generated by the photoelectric conversion device 600, the first pixel region and the second pixel region are set based on those recognition results, and image capturing is performed in each region using different accumulation periods. It is thereby possible to recognize an image more quickly than the full frame period, and it becomes possible to reduce the amount of data and the energy consumption while increasing the S/N and decreasing the blur for pixels due to movement.

In addition, in the present embodiment, although an example has been explained based on an image that has been captured and generated by the photoelectric conversion device 600 in relation to the recognition of the traffic participant target, the image is not limited thereto, and a distance measurement device such as a millimeter wave radar or LiDAR may also be used. By using millimeter wave radar or LiDAR, it is possible to more precisely obtain the movement direction and the movement speed of the traffic participant target, and it becomes possible to more precisely set the surrounding regions of the traffic participant target.

Fourth Embodiment

Figure 16:
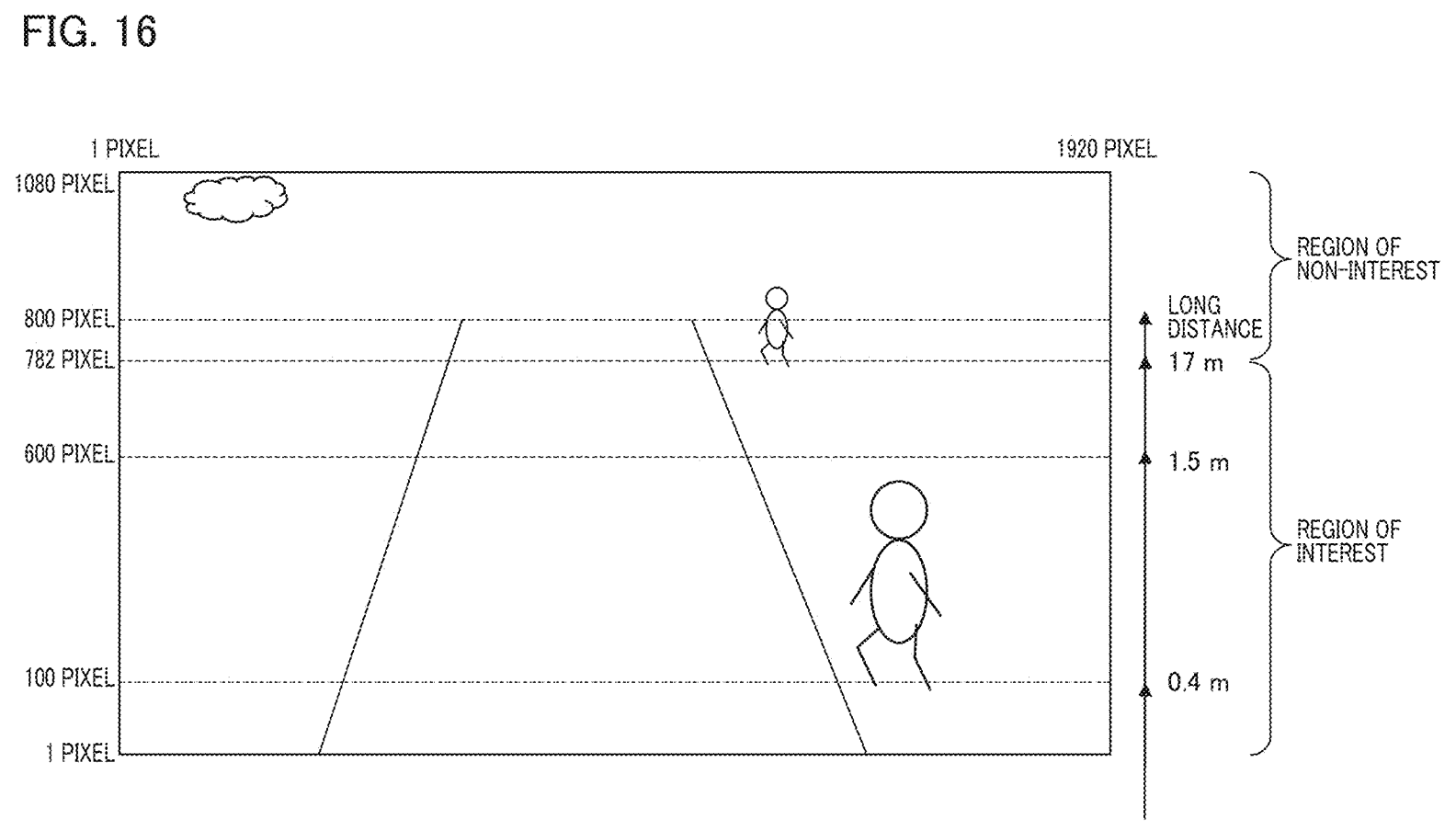

Next, an example of a different method for setting the region of interest by performing segmentation in the column direction will be explained in the Fourth Embodiment. The Fourth Embodiment is an example that is a variation of the Second Embodiment. FIG. 16 is a diagram explaining an example of setting the region of interest in the Fourth Embodiment, and the setting range for the region of interest in FIG. 16 differs from that in FIG. 12.

In FIG. 16, the position of the $782^{nd}$ pixel from the bottom captures images of an object that exists in a position that is about 17 m ahead of the photoelectric conversion device 600, and in the Fourth Embodiment, the range below the $782^{nd}$ pixel from the bottom is made the region of interest and set as the first pixel region. In addition, the range from the $783^{rd}$ pixel from the bottom and above is made the region of non-interest and is set as the second pixel region.

This is because in a case in which the distance between the movable apparatus 700 and a traffic target such as another vehicle, a pedestrian, and the like is short, in the worst case scenario that a vehicle in front of the movable apparatus suddenly brakes or a pedestrian suddenly runs into the road, and the like, the risk of collision is high.

Therefore, by making a short distance range (the range below the $782^{nd}$ pixel from the bottom) the region of interest and setting this as the first pixel region, and then acquiring images during a first accumulation period that is shorter than a full frame period, traffic participants (the traffic participant target) are quickly recognized, and it thereby becomes possible to recognize the risk of collision more quickly.

In contrast, in the second pixel region, which is the long distance range, even in a worst case scenario such as a vehicle in front of the movable apparatus 700 braking suddenly, or a pedestrian running into the road, and the like there is a sufficient distance, and there would be time until a collision occurs. Therefore, even if images are acquired during an accumulation period that is approximately equal to the full frame period, it still becomes possible to sufficiently avoid a collision.

Therefore, in the second pixel region, by not acquiring images during the shorter accumulation period, it becomes possible to decrease the amount of data, and it also becomes possible to suppress the energy consumption of the sensor unit 100 or the photoelectric conversion device 600.

In addition, in the first pixel region, image capturing is performed during an accumulation period in which one full frame period with a length of 33.3 ms has been segmented into four, and in the second pixel region, image capturing is performed during the accumulation period as is without segmenting the one full frame period with the length of 33.3 ms.

Provisionally, in a case in which the movable apparatus 700 has moved at a speed of 30 km per hour in the M column direction, if a traffic participant (traffic participant target) with a high risk of collision is recognized in a position that is about 15 m away from the photoelectric conversion device 600, if the braking distance for the automobile until a complete stop is considered, about 14 m is necessary.

Furthermore, in order to determine the risk of collision from an image using the recognition unit 604, it is necessary to evaluate the risk of collision using an object detecting algorithm in which the position and region of the object within the image are specified, as well as the position and speed of the target that has been detected, the movement of the vehicle, and the like.

In the present embodiment, a case is considered in which provisionally, a determination is made using ten images. In a case in which image capturing is performed during the accumulation period as is, without segmenting one full frame period with a length of 33.3 ms, in order to acquire 10 images, 333 ms are necessary, and even if the movable apparatus has been traveling at a speed of 30 km per hour, it will have progressed by about 3m.

Therefore, upon considering the necessary distance for the braking distance and recognition, the distance necessary from the image capturing to a complete stop is about 17 m. In contrast, in a case in which image capturing is performed during an accumulation period in which one full frame period with a length of 33.3 ms has been segmented into four, in order to acquire ten images, 83 ms are necessary, and even if the movable apparatus has been traveling at a speed of 30 km per hour, it will have progressed by about 1 m.

Therefore, upon considering the necessary distance for the braking distance and recognition, the distance that is necessary from the image capturing until a complete stop is about 15 m, and it becomes possible to shorten the distance until a complete stop by about 2 m in comparison to a case in which the full frame period has not been segmented.

That is, in the case of an accumulation period in which one full frame period has been segmented into four parts, if image capturing is performed every 8.33 ms, it becomes possible to shorten the length until a complete stop in comparison to a case in which the full frame period has not been segmented, and it is possible to reduce the risk of a collision.

In contrast, in a case in which a traffic participant (the traffic participant target) is in a position that is about 17 m or more away from the photoelectric conversion device 600, if it is made such that image capturing is performed during an accumulation period of 33.3 ms without segmenting the full frame period in a case in which the movable apparatus has moved in the M column direction at a speed of 30 km per hour, it becomes possible to come to a full stop.

Therefore, in relation to a region that is further away than this from the photoelectric conversion device 600, even if image capturing has been performed by segmenting one full frame period, the amount of data will increase without greatly decreasing the risk of collision. That is, in a region that is a long distance away from the photoelectric conversion device 600, there is a high possibility that acquiring a large number of images having different accumulation periods will cause an increase in unnecessary data.

In this manner, in the Fourth Embodiment as well, the first pixel region and the second pixel region are appropriately set based on the device information and the installation information in relation to the movable apparatus 700 for the photoelectric conversion device 600, and image capturing is performed using different accumulation periods for each region. Therefore, it becomes possible to decrease the amount of data while decreasing the risk of collision, and it further becomes possible to decrease the energy consumption of the photoelectric conversion device 600.

Fifth Embodiment

Figure 17:
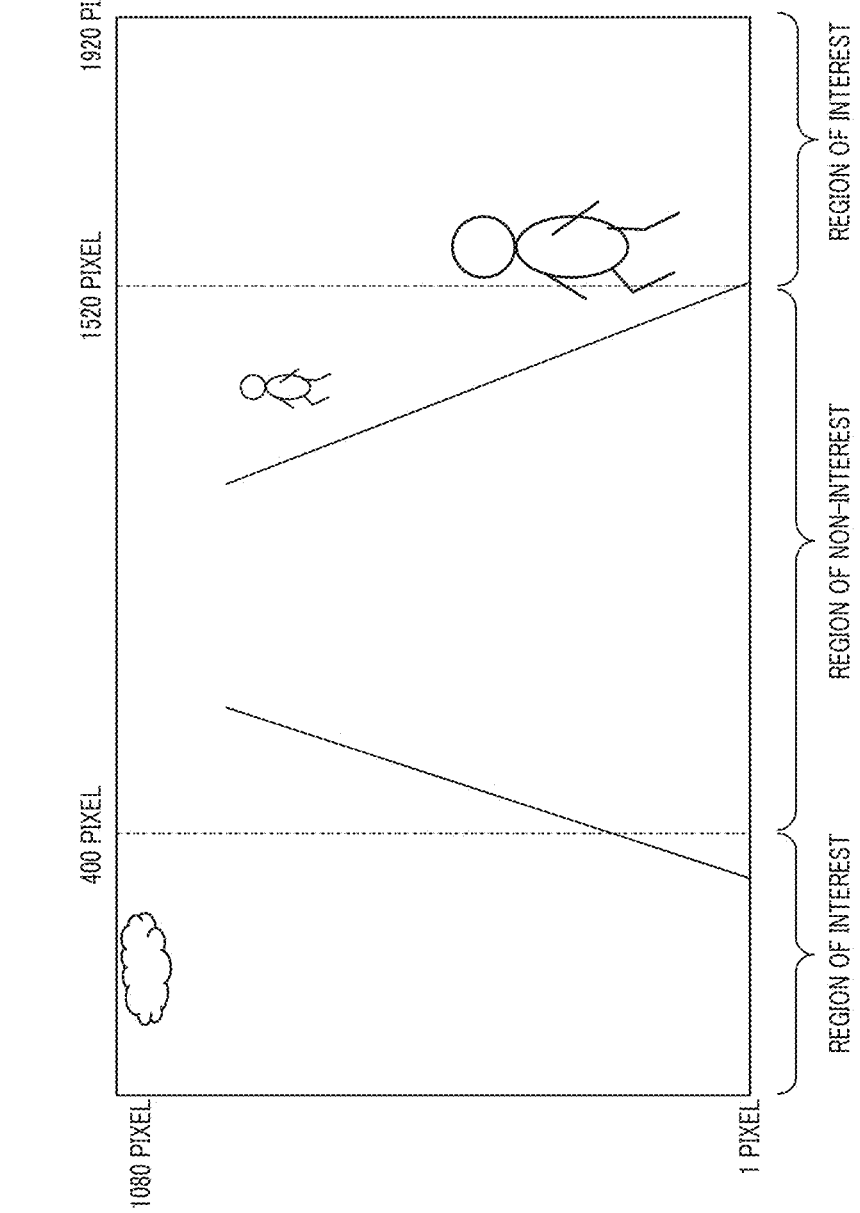
FIG. 17 is a diagram explaining an example of setting a region of interest in a Fifth Embodiment.

Next, an example of setting the region of interest by performing segmentation in the row direction of FIG. 9 will be explained using a Fifth Embodiment. FIG. 17 is a diagram explaining an example of setting the region of interest in the Fifth Embodiment. Note that the Fifth Embodiment shows a specific example of segmentation setting in the Second Embodiment.

In the Fifth Embodiment, the range below the $400^{th}$ pixel from the left and the range below the $400^{th}$ pixel from the right are set as the first pixel region. In addition, the range from the $401^{st}$ pixel from the left to the $1519^{th}$ pixel from the left is set as the second pixel region. In terms of the angle of view, both parts of the first pixel range have a range of about 25 degrees, and the second pixel region has a range of about 70 degrees.

In addition, image capturing for the first pixel region is performed during an accumulation period in which one full frame period with a length of 33.3 ms has been segmented into four, and image capturing for the second pixel region is performed during the accumulation period as is, without segmenting the one full frame period with the length of 33.3 ms.

In order to determine the risk of collision with a traffic participant (the traffic participant target) who is approaching from the side or who has run out into the road, it is necessary to evaluate the risk of collision in the recognition unit 604 using an object detection algorithm in which the position and region of the object in the image are specified, as well as the position and speed of the target that has been determined, the movements of the vehicle, and the like.

In the present embodiment, a case is considered in which provisionally, determination is performed using 10 images. In a case in which image capturing is performed during the accumulation period as is without segmenting one full frame period with a length of 33.3 ms, 333 ms are necessary in order to acquire the ten images.

In contrast, in a case in which image capturing is performed using an accumulation period in which the one full frame period with a length of 33.3 ms has been segmented into four, 83 ms are necessary in order to acquire the ten images. Therefore, a 250 ms difference in time occurs between the two.

If a person runs into the road from the side, the time of 250 ms is a time during which the person will progress from about 30 cm to about 80 cm, and this is a distance in which it is possible to decrease the risk of collision. In addition, in a case in which the movable apparatus is progressing at a speed of 30 km per hour, this is a time in which the movable apparatus will have progressed by about 2 m, and furthermore, if the speed of the movable apparatus is 60 km per hour, it will have progressed by about 4 m in this time, and this is also a distance in which it is sufficiently possible to decrease the risk of collision.

In contrast, in the second pixel region, which is the range of the center of the image capturing region, image capturing is performed of the travel direction of the movable apparatus 700, and this is a region for which the risk of an unexpected phenomenon such as a traffic participant (the traffic participant target) running out into the road, and the like is low, and if the distance between vehicles is maintained, the risk of collision is low. Therefore, even if images for an accumulation period that is shorter than the full frame period are acquired, the amount of unnecessary data will increase. Therefore, in the second pixel region, by not acquiring images for the shorter accumulation period, this becomes effective to decrease the amount of data, and it also becomes possible to inhibit the energy consumption of the photoelectric conversion device 600.

In this manner, in the present embodiment, the first pixel region and the second pixel region are set based on the device information and installation information for the photoelectric conversion device 600, and image capturing is performed for each of the regions using different accumulation periods. It is thereby possible to decrease situations in which when the subject has moved, they protrude from the image capturing region and cannot be image captured.

In addition, in cases such as when a subject is recognized that has suddenly entered the image capturing region from outside of the image capturing region, and tracking image capturing is performed with this subject as the target, and the like, it is possible to rapidly image capture, recognize, and record the subject that has suddenly appeared from the left to right edge, and it becomes possible to decrease the amount of data and the energy consumption.

Sixth Embodiment

Next, an explanation will be given in a Sixth Embodiment of an example in which, for example, the first pixel region, which is the region of interest, and the second pixel region, which is the region of non-interest, are changed according to changes in the image capturing region that is captured by the optical system 601 of the photoelectric conversion device 600.

In this context, changes to the image capturing region are specifically region changes due to a shift of the image capturing region in the optical system 601, enlargement or contraction due to zooming in or out, and the like. In addition, the distance relationships with the photoelectric conversion device 600 in the positions of the pixels in the sensor unit 100 change by for example, the installation angle of the photoelectric conversion device 600 being changed.

Conversely, the photoelectric conversion device may be re-installed, and a movable part may be provided on the attachment unit of the photoelectric conversion device 600, and the range that is image captured by the photoelectric conversion device 600 may be changed by moving this movable part. In addition, the installation angle may also be set manually using the control unit 605, or a gyro sensor and the like that detects the angle may also be provided in the detection unit 602 of the photoelectric conversion device 600 and this may be detected.

For example, if the photoelectric conversion device 600 is inclined downward, it becomes such that images are captured from a shorter distance in the position of the same pixel of the sensor unit 100. Therefore, in a case in which the photoelectric conversion device inclines downward, it is preferable that the first pixel region, which is the region of interest, is set to be wider than in comparison to before it was inclined downward.

In contrast, if the photoelectric conversion device is inclined upward, it becomes such that images are captured further away in the position of the same pixel in the sensor unit 100. Therefore, in a case in which this is inclined upward, it is preferable to set the first pixel region, which is the region of interest, so as to be narrower than in comparison to before the photoelectric conversion device 600 was inclined upwards.

In the manner that was described above, in the photoelectric conversion apparatus according to the Sixth Embodiment, by changing the first pixel region, which is the region of interest, and the second pixel region, which is the region of non-interest, according to the installation angle of the photoelectric conversion device 600, the region of interest is made a short distance region and is set as the first pixel region. It thereby becomes possible to capture images of the subject inside the image capturing region and to inhibit image blur for the subject by acquiring images from during an accumulation period that is shorter than a full frame period. Furthermore, it also becomes possible to reduce the risk of collision with a traffic participant (the traffic participant target) who is a short distance from the movable apparatus.

In contrast, in the second pixel region, which is in the long distance range, it is possible to capture images of a subject within the image capturing region even if the subject has moved, and image blur for the subject does not regularly occur. Furthermore, even in a movable apparatus, the risk of collision with a long distance traffic participant (traffic participant target) is low, and therefore, by not acquiring images during the shorter accumulation period in the second pixel region, this becomes effective in decreasing the amount of data, and it also becomes possible to inhibit the energy consumption of the photoelectric conversion device 600.

In addition, as the optical characteristics of the optical system 601, the first pixel region, which is the region of interest, and the second pixel region, which is the region of non-interest, may also be changed according to changes in the distance relationship between the position of a pixel and the photoelectric conversion device 600 due to the zoom function of the photoelectric conversion device 600.

Conversely, the first pixel region, which is the region of interest, and the second pixel region, which is the region of non-interest, may also be changed according to changes in the distance relationship between a position of a pixel and the photoelectric conversion device 600 due to the tilt function of the optical system 601 of the photoelectric conversion device 600, and the like.

Region update parameters due to these changes in the installation angle and the optical properties of the photoelectric conversion device 600 are stored on the memory of the control unit 605. In addition, it is also possible to change the first pixel region, which is the region of interest, and the second pixel region, which is the region of non-interest, according to these parameters.

In this manner, in the Sixth Embodiment, the first pixel region, which is the region of interest, and the second pixel region, which is the region of non-interest, are changed in accordance with changes to the image capturing region of the photoelectric conversion device 600. It is thereby possible to reduce the amount of data and the energy consumption of the photoelectric conversion device 600 while inhibiting subject blur on a moving subject at a short distance and decreasing the risk of collision with a traffic participant (traffic participant target) at a short distance in a movable apparatus.

Note that changes to the image capturing region include cases in which the photoelectric conversion device 600 inclines to the left or the right. If the photoelectric conversion device 600 is inclined to the right, it will become such that the right side of the image in the position of the same pixel of the sensor unit 100 is more included than it was before the image capturing device was inclined. Therefore, in comparison to before the inclination to the right, the region on the right side will become wider, and the region on the left side will become narrower.

Conversely, if the image capturing device 600 is inclined to the left, it will become such that the left side in the position of the same pixel of the sensor unit 100 will be more included in the image than before this inclination. Therefore, in comparison to before the inclination to the left, the region on the left side will become wider and the region on the right side will become narrower.

Inclining the photoelectric conversion device 600 to the right or left is, for example, a case in which a surveillance camera performs image capturing while tilting the camera to the right and left, or a case in which in order to survey the travel direction when turning left or right, a vehicle-mounted camera predominantly monitors one side.

In this manner, it is preferable that the region of interest is changed according to the inclination to the left or right of the photoelectric conversion device 600, or the travel direction of the movable apparatus. For example, in the Sixth Embodiment, in a case in which the photoelectric conversion device 600 has been inclined to the right, settings are performed such that the region of interest on the right side is made larger than the region of interest on the left side, and in a case in which the photoelectric conversion device 600 has been inclined to the left, settings are performed such that the region of interest on the left side is made larger than the region of interest on the right side. In addition, in the case of a movable apparatus, it is preferable that the travel direction and the region of the surroundings thereof are set so as to be large and made the region of interest.

As has been explained above, in the Sixth Embodiment, the first pixel region, which is the region of interest, and the second pixel region, which is the region of non-interest, are changed according to the installation state of the photoelectric conversion device 600. In addition, the first pixel region is thereby set as the region of interest, and images are acquired during an accumulation period that is shorter than a full frame period.

It is thereby possible to captured image of a subject within the angle of view, and it becomes possible to suppress image blur for the subject. Furthermore, it also becomes possible to reduce the risk of collusion in a movable apparatus due to a traffic participant (traffic participant target) being at a close distance or a traffic participant running out into the road.

In contrast, in the second pixel region, it is possible to capture images of the subject within the angle of view even if the subject has moved, and image blur for the subject does not regularly occur. Furthermore, the risk of collision in a movable apparatus due to a long-distance traffic participant (traffic participant target) or a traffic participant target running into the road from the side is low, and therefore, even if images are acquired during an accumulation period that is shorter than a full frame period, the amount of unnecessary data will increase.

Therefore, acquiring images in the second pixel region during a second accumulation period that is longer than a first accumulation period is effective in decreasing the amount of data, and makes it possible to suppress the energy consumption of the photoelectric conversion device 600.

In addition, instead of making changes just according to the inclination of the photoelectric conversion device 600, the first pixel region, which is the region of interest, and the second pixel region, which is the region of non-interest, may also be changed according to changes in the relationship between the position of a pixel and the image capturing range due to a zoom function that serves as an optical characteristic of the optical system 601.

Conversely, the first pixel region, which is the region of interest, and the second pixel region, which is the region of non-interest, may also be changed according to changes in the relationship between the position of a pixel and the image capturing range in the photoelectric conversion device 600 due to a tilt function of the optical system 601, and the like.

In addition, the region update parameters due to these changes in the installation angle and the optical characteristics of the photoelectric conversion device 600 are recorded in the memory in the control unit 605, and the first pixel region, which is the region of interest, and the second pixel region, which is the region of non-interest, may also be changed according to these parameters.

Seventh Embodiment

In the Seventh Embodiment, the first pixel region, which is the region of interest, and the second pixel region, which is region of non-interest, are set according to, for example, the distance information for up until a subject in an image capturing region that is captured by the optical system 601 of the photoelectric conversion device 600.

This distance information may also be acquired from a distance measurement device such as millimeter wave radar, LiDAR (light detection and ranging), and the like. In addition, distance information that is obtained from an image that has been acquired by the photoelectric conversion device 600 may also be used.

Conversely, distance information that has been obtained from stereo distance measurements from a photoelectric conversion device and the like other than the photoelectric conversion device 600, or stereo distance measurements from a stereo camera and the like that is different from the photoelectric conversion device 600 may also be used.

This distance measurement information is sent to the control unit 605 via the detection unit 602 and the communications unit 607. In addition, the first pixel region, which is the region of interest, and the second pixel region, which is the region of non-interest, are set in the control unit 605, for example, in the column direction using this distance information.

Note that an example will be explained in the present embodiment in which the distance information is distance measurement data within the angle of view that is acquired using LiDAR. It becomes possible to obtain precise measurement data even in relation to subjects having a large height when the distance measurement data has been acquired using LiDAR.

Figure 18:
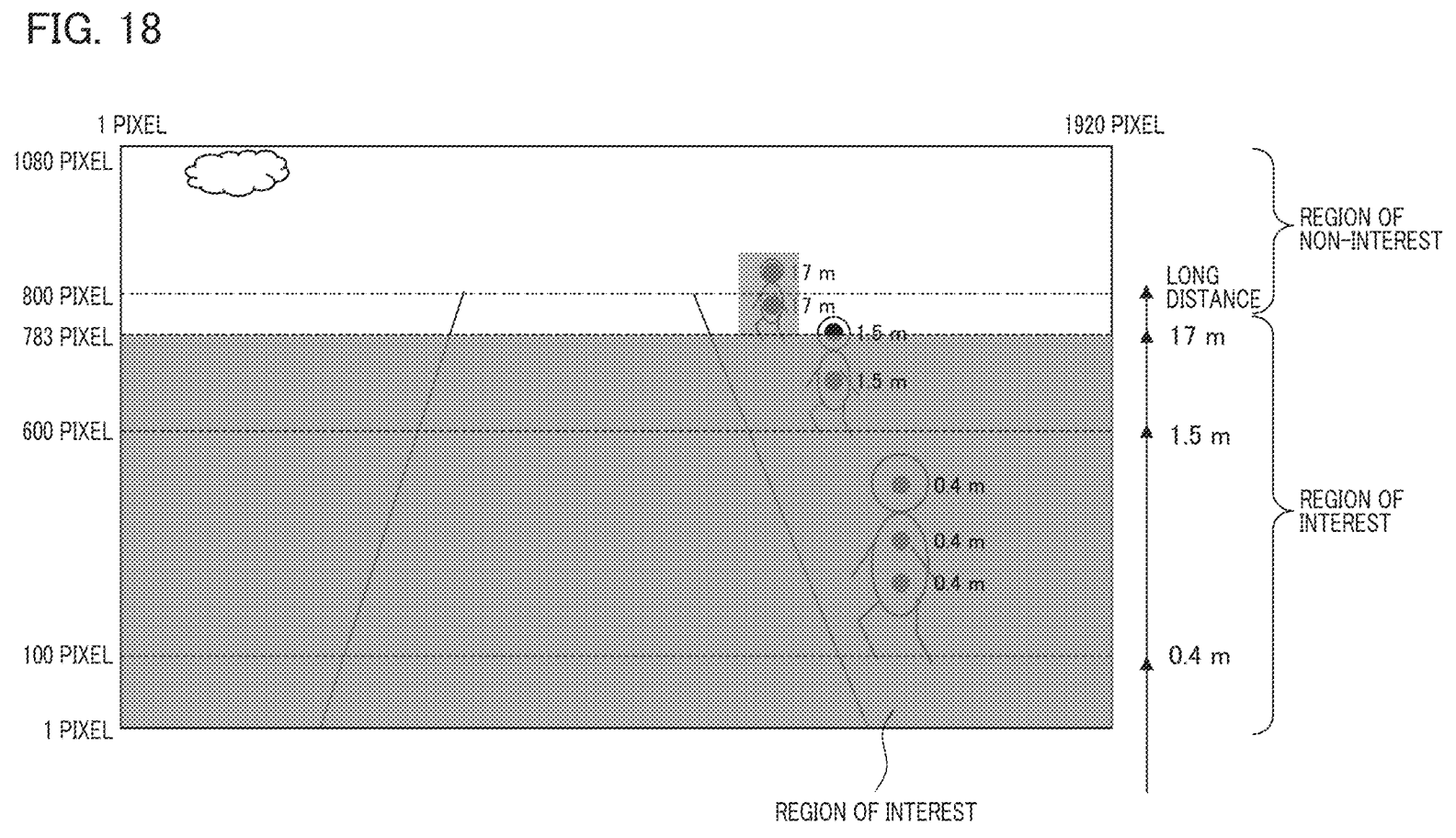

FIG. 18 is a diagram explaining an example of setting the region of interest in the Seventh Embodiment. As is shown in FIG. 18, it is preferable that when a person is standing in a position that is at a distance of, for example, 17 m, this person's entire body is recognized as the subject of interest.

However, as is shown in FIG. 18, in a case in which a distance measurement method is used for a recognition base that calculates the distance at a position of a pixel in the column direction of the sensor unit 100, errors occur when trying to accurately calculate the distance of a person or an object with a tall height. That is, there are cases in which, for example, the upper half of a person who is standing in a position at a distance of 17 m is recognized as being in a position that is further away than 17 m.

However, by performing the distance measurement using LiDAR, such recognition errors can be greatly decreased. Therefore, by setting the first pixel region, which is the region of interest, and the second pixel region, which is the region of non-interest, based on the distance measurement information, it is possible to greatly increase the precision of the region settings.

In this manner, in the Seventh Embodiment, the region of interest and the region of non-interest are set according to distance measurement information that has been acquired by LiDAR, and images are acquired during an accumulation period that is shorter than a full frame period in the region of interest. It is thereby possible to capture images of a subject within the angle of view, and it becomes possible to suppress image blur for the subject. In addition, this is also effective in decreasing the risk of collision of the movable apparatus 700 with a subject at a short distance.

In addition, in the same manner, in a case in which the region of interest is set in the column direction as well, it becomes possible to set the region of interest according to a distance from the photoelectric conversion device 600, a distance until a crosswalk from a traveling lane, and the like.

In addition, by setting the region of interest and the region of non-interest according to the distance measurement information and acquiring images in the region of interest during an accumulation period that is shorter than the full frame period, it becomes possible to decrease situations in which a subject cannot be image captured because they have exited the angle of view in a case in which the subject has moved.

In addition, in a case in which a subject that has suddenly entered the angle of view is recognized, and tracking image capturing is performed with this subject as the target, and the like, it becomes possible to rapidly image capture and recognize the subject who has entered the angle of view from the right or left side, and it becomes possible to perform appropriate image capturing of the target more quickly. In addition, it is also possible to decrease the risk of collision for the movable apparatus 700 due to a traffic participant and the like (traffic participant target) running out into the road.

Eighth Embodiment

In the Eighth Embodiment, in a case in which the photoelectric conversion device 600 is installed on the movable apparatus 700, the first pixel region, which is the region of interest, and the second pixel region, which is the region of non-interest, are changed according to information for the movable apparatus 700 and the like, and environmental information for the movable apparatus 700.

Note that as was explained above, the information for the movable apparatus includes at least one of the vehicle speed information, the acceleration information, the handle operation information, the brake information, the engine information, and the like. In addition, the environmental information includes at least one of information for the traffic participant (traffic participant target) in the surroundings of the movable apparatus, map information, GPS information, the state of the road, the condition of the road surface, weather information, the brightness of the surroundings, the time, and the like.

In the Eighth Embodiment, an example will be explained of a case in which the speed of the movable apparatus 700 has increased. If the speed of the movable apparatus 700 increases, the distance range in which there is a high risk of collision becomes wider. Therefore, in the Eighth Embodiment, the first pixel region, which is the region of interest, is set as a wide range in accordance with increases in the speed of the movable apparatus 700.

For example, the speed of the movable apparatus 700 is received by the control unit 605 via the ECU 701. The control unit 605 uses the computer program to calculate and set an appropriate region of interest based on the speed of the movable apparatus 700.

Figure 19:
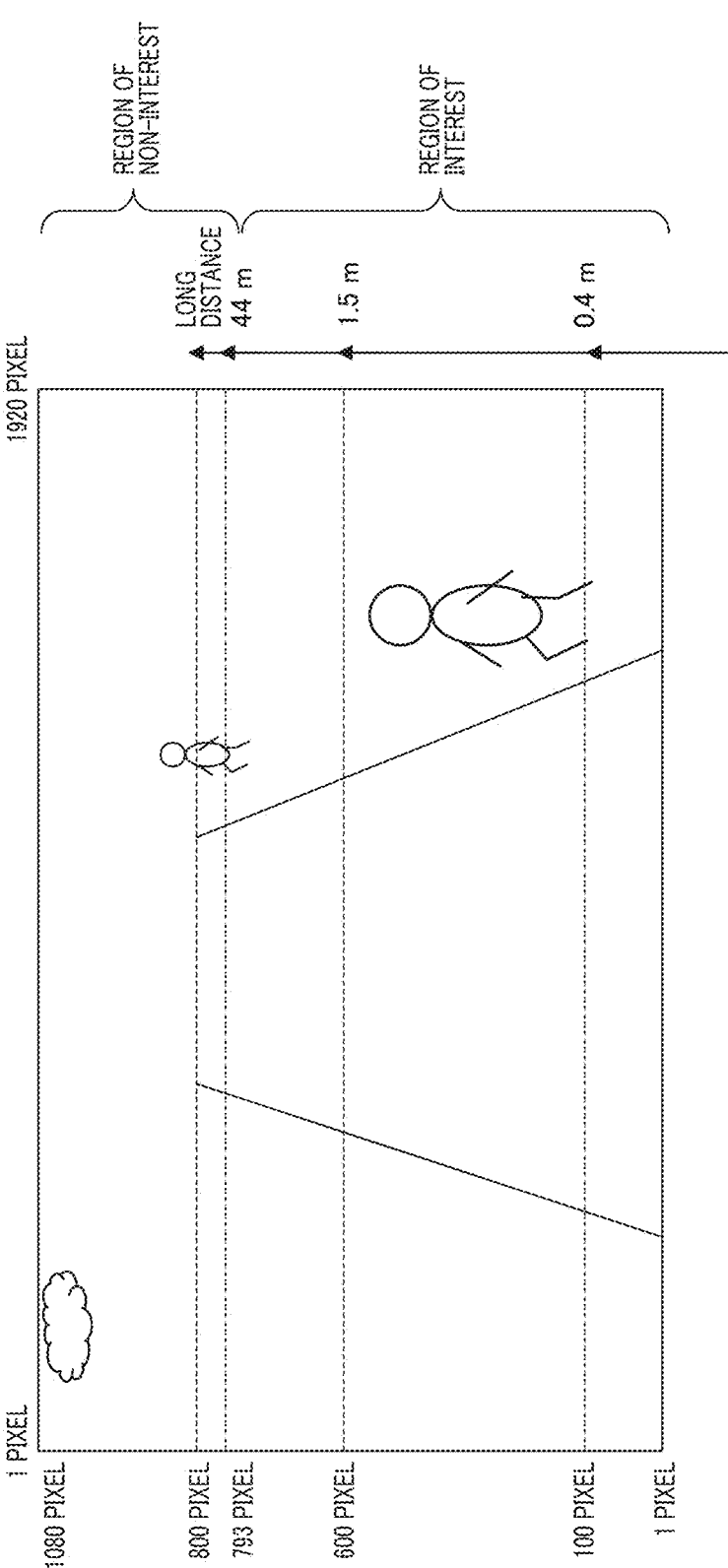
FIG. 19 is a diagram showing an example of setting a region of interest in an Eighth Embodiment.

Provisionally, the speed at this time is made a speed of 60 km per hour. The braking distance for the case of a speed of 60 km per hour is about 44 m. Therefore, it is preferable that the region of interest is set as a range of about 44 m from the movable apparatus. FIG. 19 is a diagram explaining an example of setting a region of interest in the Eighth Embodiment. In FIG. 19, the range of about 44 m from the movable apparatus corresponds to the $793^{rd}$ pixel from the bottom.

In the Eighth Embodiment, in the case of, for example, a speed of 60 km per hour, by setting this range as the region of interest and performing image capturing and recognition during the first accumulation period in this region of interest, it becomes possible to reduce the risk of collision between the movable apparatus 700 and a traffic participant (traffic target participant), and the like.

In addition, further preferably, it is preferable that the region of interest is set according to not just the speed of the movable apparatus 700, but also the braking distance of the movable apparatus 700. This is because as the braking distance becomes longer, the distance until a complete stop becomes longer, and therefore, the region in which there is an increased risk of collision becomes a longer distance, and it becomes necessary to widen the range in which caution is needed in relation to a subject suddenly running into the road from the side.

Note that the braking distance changes not just based on the speed of the movable apparatus 700, but also due to the angle of inclination of the road surface, the conditions of the road surface (if it is asphalt, dirt, gravel, if there is rain or snow, if it has frozen over), the degree of consumption of the tires (the characteristics, the usage distance, the usage years, and the like of the tires themselves), the weight of the movable apparatus 700, and the like. Therefore, it is preferable if this information is used comprehensively in order to make a determination.

The first pixel region, which is the region of interest, and the second pixel region, which is the region of non-interest, may also be set according to this information relating to the braking distance. That is, this information relating to the braking distance is sent to the control unit 605 via the ECU 701, the control unit 605 uses the computer program, and calculates and sets an appropriate region of interest based on the information relating to the braking distance of the movable apparatus 700.

In addition, the width of the lane, the distance from a crosswalk and the like, the position of an intersection, and the like may also be acquired from map information, and the first pixel region, which is the region of interest, and the second pixel region, which is the region of non-interest, may also be set according to this information.

It is also possible to gather the map information in the control unit 605 via the ECU 701, perform calculations in the computer program, and then set the first pixel region, which is the region of interest, and the second pixel region, which is the region of non-interest.

Ninth Embodiment

Figure 20:
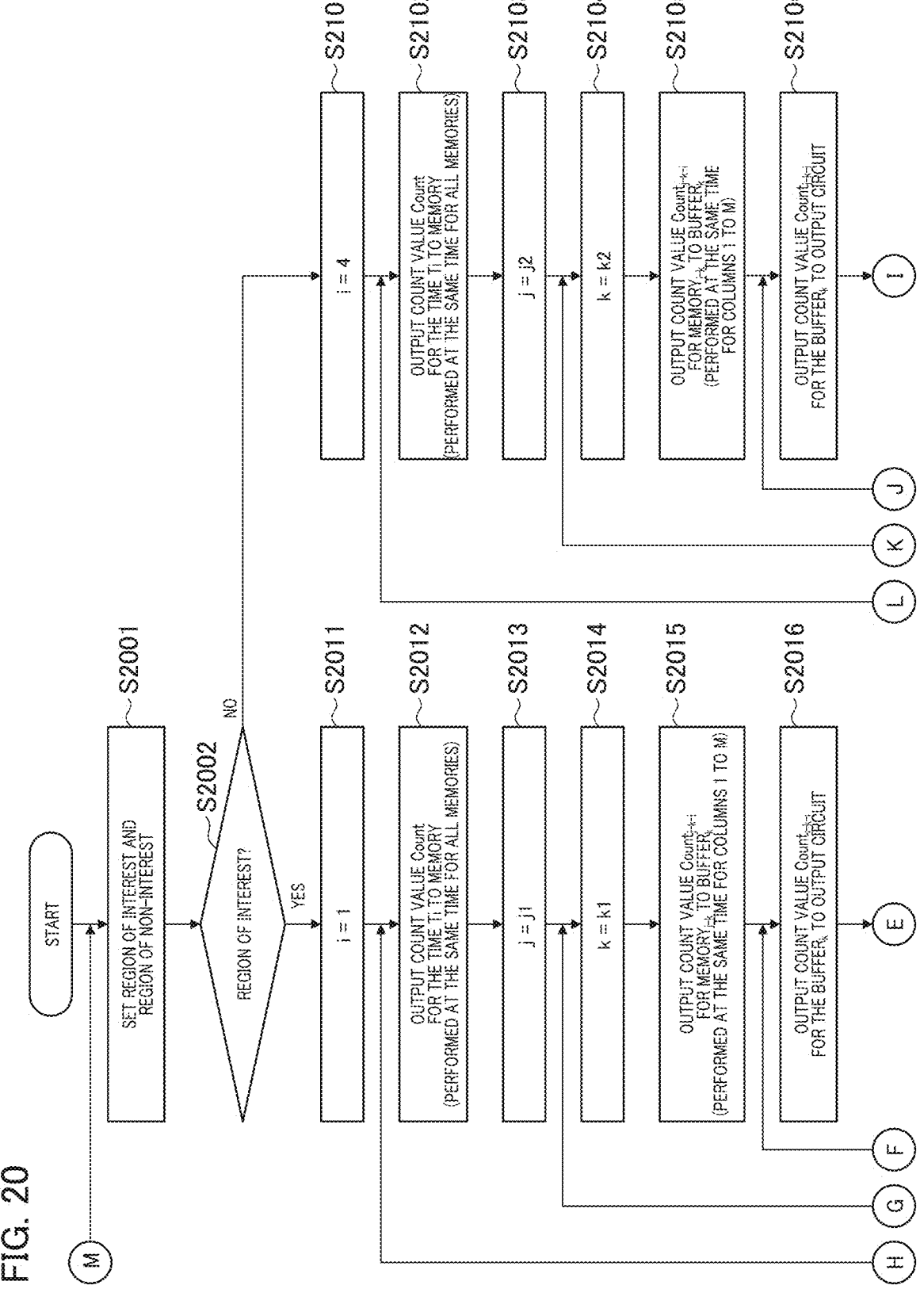
FIG. 20 is a flowchart showing details of a drive example for a sensor unit 100 relating to a method for setting an region of interest according to a Ninth Embodiment.
Figure 21:
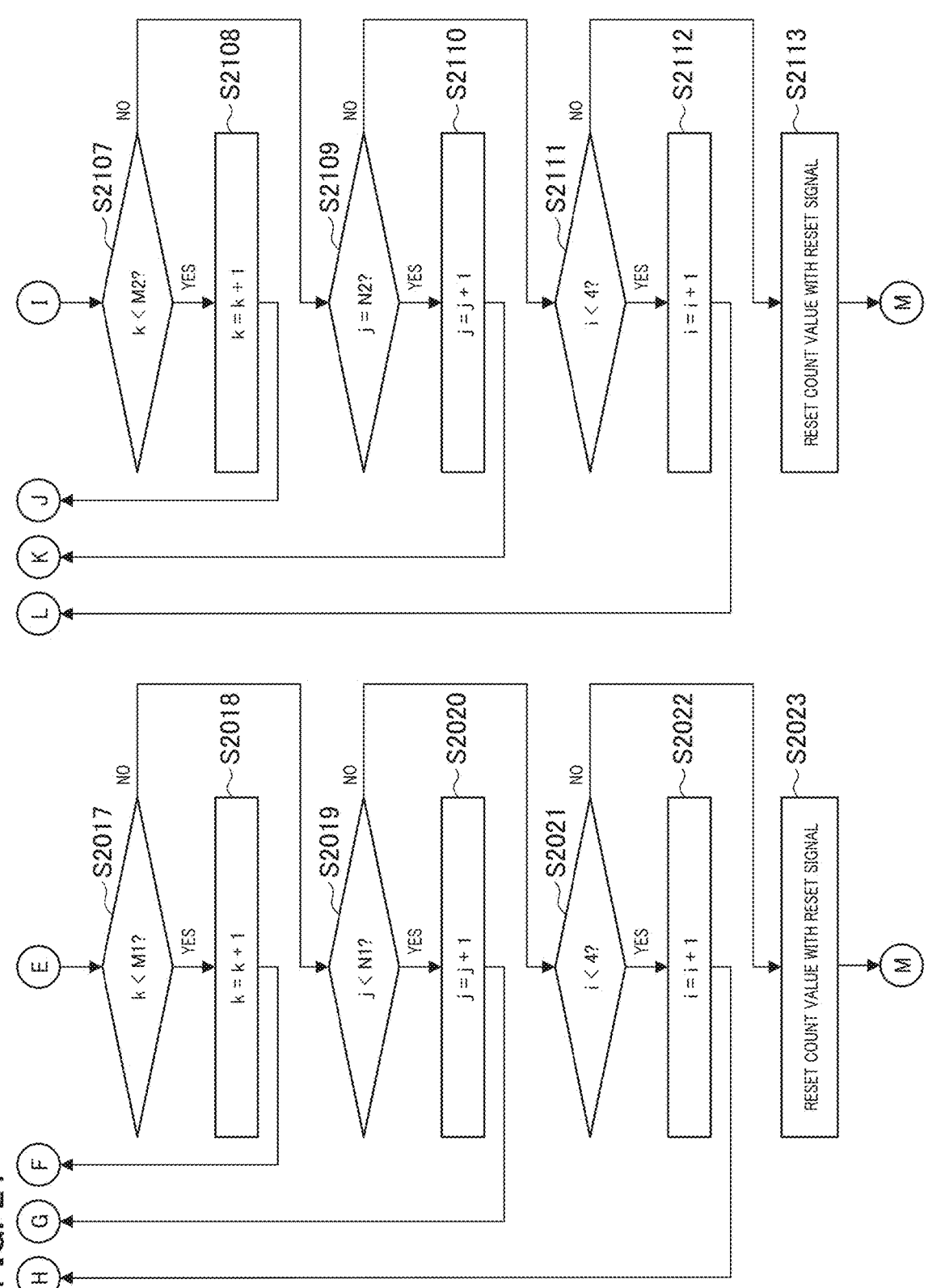
FIG. 21 is a flowchart that is a continuation of FIG. 20.

Next, FIG. 20 is a flowchart showing the details of an example of driving the sensor unit 100 in relation to the setting method for the area of interest according to the Ninth Embodiment, and FIG. 21 is a flowchart that is a continuation of FIG. 20. Note that the operations for each step of the flowcharts in FIG. 20 and FIG. 21 are performed in order by the CPU that serves as a computer inside of the control unit 605 executing the computer program that has been stored on the memory.

During step S2001, the CPU of the control unit 605 of the photoelectric conversion device 600 functions as a setting unit that sets the region of interest and the region of non-interest in the image capturing region based on characteristic information relating to characteristics of the photoelectric conversion device, installation information for the photoelectric conversion device, and environmental information for the photoelectric conversion device.

Note that the control unit 605 may also set the first pixel region and the second pixel region based on at least one of characteristic information relating to characteristics of the photoelectric conversion device, installation information relating to an installation state of the photoelectric conversion device, or environmental information relating to the surrounding environment of the photoelectric conversion device.

Furthermore, at least one of the position, size, or accumulation period for the first pixel region or the second pixel region may also be set based on at least one of the above-described characteristic information, installation information, or environmental information. In addition, it may also be made such that the first pixel region or the second pixel region is set according to the distance information to a subject.

Note that the above-described characteristic information includes at least one of the optical characteristics information for the optical system, the resolution of the sensor unit, or the pixel size of the sensor unit. In addition, the installation information includes at least one of the height, the angle, and the direction at which the photoelectric conversion device is installed. Note that the movable apparatus information that serves as one piece of environmental information includes at least one of the vehicle speed information, the acceleration information, the handle operation angle information, the brake information, the engine information, and the like.

In addition, the environmental information also includes at least one of information such as the presence or absence, position, speed, acceleration, distance, and the like of a traffic participant (a pedestrian, a motorbike, a bicycle, and the like in the surroundings of the movable apparatus), map information, GPS information, the state of the road, the conditions of the road surface, weather information, the brightness of the surroundings, the time, and the like.

In addition, the control unit may also set the first pixel region or the second pixel region based on an output from an ECU serving as a movement control unit. Note that it may also be made such that at least one of the position or size of the first pixel region or the second pixel region can be set by the user.

In the present embodiment, an example is explained for a case in which there is one region of interest and one region of non-interest. Note that for the purpose of this explanation, the accumulation period for the first pixel region, which is the region of interest, is made an accumulation period in which one full frame period has been segmented into four, and the accumulation period for the second pixel region, which is the region of non-interest, is made one full frame period that has not been segmented.

In this context, the first pixel region is made the region that starts from the pixel for the j1 row and the k1 column until the N1 row and the M1 column, and image capturing is executed during four different accumulation periods, whereas the second pixel region is made the region starting from the j2 row and the k2 column until the N2 row and the M2 column, and image capturing is executed during one accumulation period.

Next, during step S2002, the CPU of the control unit determines whether or not a region is a region of interest. In the case of yes, the processing transitions to step S2011, and the processing for determining the accumulation period is performed. In contrast, in a case in which No has been determined during step S2002, the processing transitions to step S2101.

The region of interest is segmented into four and therefore, this is repeated with i starting at 1 until 4. Therefore, during step S2011, the CPU of the control unit first sets the value of i to 1. Next, during step S2012, the CPU of the control unit outputs a count value Count from the counter 211 during time Ti to the memory 212. At this time, output is performed at the same time to all of the memories. This operation corresponds to the operation for the time T1 in FIG. 7.

Next, during step S2013, the CPU of the control unit sets j=j1. j1 is the starting position for the N rows of the region of interest. Next, during step S2014, the CPU of the control unit sets k=k1. k1 is the starting position of the M columns in the region of interest.

During step S2015, the CPU of the control unit outputs the count value Count (j–k–i) for the memory j–k in FIG. 9 to the buffer. At this time, the columns 1 to M are output to the buffers at the same time. This operation means an operation in which the count values for one row of FIG. 9 are taken into the buffers.

During step S2016, the CPU of the control unit outputs the count value Count (j–k–i) for the buffer k to the output circuit 114. This operation corresponds to an operation for reading out the signal for the buffers for the left most column in FIG. 9 from the output circuit.

Next, the processing proceeds to step S2017 of FIG. 21 via E, and during step S2017, the CPU of the control unit determines if k<M1, and in the case of Yes, during step S2018, k is increased by one by making this k=k+1, and the processing returns to step S2016 via F. M1 is the finish position for the M columns of the region of interest. This operation corresponds to an operation to read out the signals from the buffers for the second column from the left in FIG. 9 from the output circuit.

In a case in which No has been determined during step S2017, that is, in a case in which k=M1, this means that the readout of the signal for the buffer for the M1$^{st}$ column from the output circuit has been completed, and next, the processing proceeds to step S2019, and the CPU of the control unit determines if j<N1. N1 is the ending position for the N rows of the region of interest. In a case in which Yes has been determined during step S2019, during step S2020, the CPU of the control unit makes j=j+1, increases j by one, and the processing returns to step S2014 via G. This corresponds to a process for beginning the read out of the next row.

In a case in which No has been determined during step S2019, this means that the read out has been completed for all of the rows, and therefore, the processing proceeds to step S2021, and the CPU of the control unit determines whether or not j<4. In a case in which Yes has been determined during step S2021, the CPU of the control unit increases i by one by making this i=i+1, and the processing returns to step S2012 via H. This operation corresponds to an operation for starting the readout for the next time T2.

In a case in which No has been determined during step S2021, this means that the read out during the time T4 has been completed and therefore, the processing proceeds to step S2023, and the CPU of the control unit resets the counter 211 using the reset signal. This operation corresponds to an operation for resetting the counter 211 for the time T4 in FIG. 7. After step S2023, the processing returns to step S2001 via M. In the above manner, it is possible to perform the read out of the signals that have accumulated in the sensor unit in order.

In contrast, the region of non-interest does not segment one full frame period and therefore, it becomes such that only the flow for the case in which i is 4 is performed. Therefore, during step S2101, the CPU of the control unit sets i=4. Next, during step S2102, the CPU of the control unit outputs the count value Count from the counter 211 for the time Ti to the memory 212. At this time, output is performed to all of the memories at the same time. This operation corresponds to the operation for the time T1 of FIG. 7.

Next, during step S2103, the CPU of the control unit sets j=j2. j2 is the starting position for the N rows of the region of non-interest. Next, during step S2104, the CPU of the control unit sets k=k2. k2 is the starting position for the M columns of the region of non-interest.

During step S2105, the CPU of the control unit outputs the count value Count (j–k–i) for the memory j–k of FIG. 9 to the buffer. At this time, the $1^{st}$ to $M^{th}$ columns are output to the buffers at the same time. This operations means an operation in which the count values for the first row in FIG. 9 are taken into the buffers.

During step S2016, the CPU of the control unit outputs the count value Count (j–k–i) for the buffer k to the output circuit 114. This operation corresponds to an operation for reading out the signals for the buffers from the left-most column in FIG. 9 from the output circuit.

Next, the processing proceeds to step S2107 of FIG. 21 via I, and during step S2017, the CPU of the control unit determines if k<M2. In the case of Yes during step S2017, during step S2108, the CPU of the control unit increases k by one by making this k=k+1, and the processing returns to step S2016 via J. M2 is the ending position for the M columns of the region of non-interest. This operation corresponds to an operation for reading out the signals for the buffers for the second column from the left in FIG. 9 from the output circuit.

In the case of No during step S2107, that is, in the case of k=M2, this means that the read out of the signals for the buffers from the M2th column of FIG. 9 from the output circuit has been completed, and next, the processing proceeds to step S2109, and the CPU of the control unit determines if j<N2.

N2 is the ending position for the N rows of the region of non-interest. In the case of Yes during step S2109, during step S2110, the CPU of the control unit increases j by one by making this j=j+1, and the processing returns to step S2104 via K. This corresponds to an operation for beginning the read out of the next row. In the case in which No has been determined during step S2109, this means that the read out has been completed for all of the rows, and therefore, the processing proceeds to step S2111, and the CPU of the control unit determines whether or not j<4.

In the case in which Yes has been determined during step S2111, the CPU of the control unit increases i by one by making this i=i+1, and the processing returns to step S2102 via L. This operation corresponds to an operation for starting the read out for the next time T2. However, during step S2101, i=4 is set, and therefore, this becomes No during step S2111.

In a case in which No has been determined during step S2111, this means that the read out for the time T4 has been completed, and therefore, the processing proceeds to step S2113, and the CPU of the control unit resets the counter 211 using the reset signal. This operation corresponds to an operation for resetting the counter 211 for the time T4 of FIG. 7. After step S2113, the processing returns to step S2001 via M. In the above manner, it is possible to perform the read out of the signals that have accumulated in the sensor unit in order.

Therefore, in contrast to the region of interest, in which the processing starts from the pixel for the j1 row and k1 column, and is repeated until the N1 row and the M1 column, with image capturing being executed during four different accumulation periods, in the region of non-interest, the processing starts from the pixel for the j2 row and the k2 column, and is repeated until the N2 row and the M2 column, with image capturing being executed only during one accumulation period.

Next, the processing for the images that have been acquired from both the region of interest and the region of non-interest in the photoelectric conversion device 600 will be explained. The acquisition method for images for the region of interest is performed based on the method that was shown in FIG. 20, and FIG. 21. In addition, images are acquired in the region of interest during the four accumulation periods from FIG. 7 of the frame 1_1, the frame 1_2, the frame 1_3, and the frame 1_4. In contrast, images are acquired during only the accumulation period for the frame 1_4 of FIG. 7 in the region of non-interest.

Figure 22:
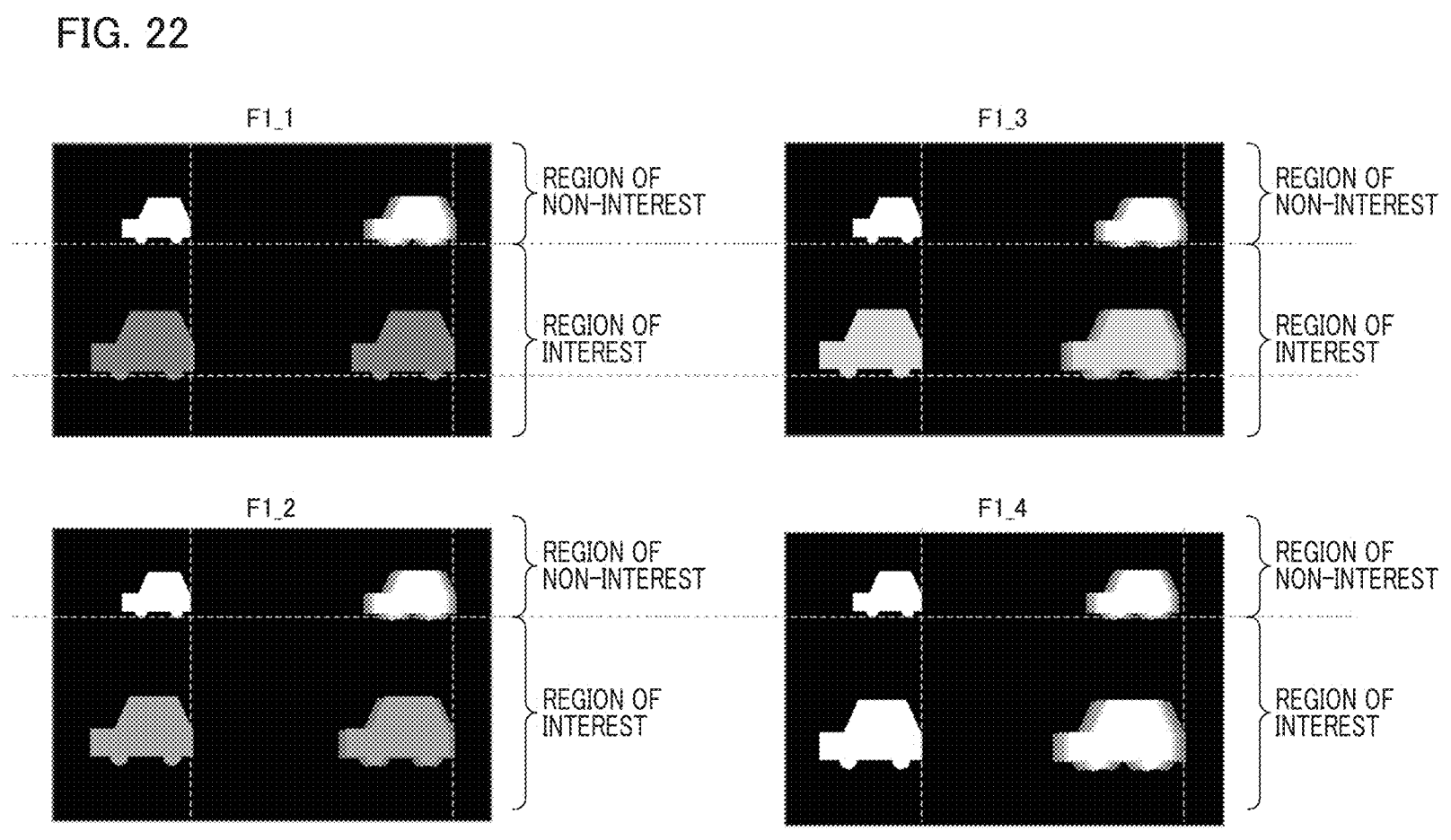

An example of an image that is created according to the flow in FIG. 20, and FIG. 21 is shown in FIG. 22. FIG. 22 is a diagram showing examples of images for each of a plurality of accumulation periods in which settings for the region of interest are performed. In each diagram, the range in which short distance image capturing is performed, which is the lower side, is made the region of interest, the range in which long distance image capturing is performed, which is the upper side, is made the region of non-interest, and in addition, the vehicle on the left side is stopped, while the vehicle on the right side is progressing from the right to the left at a certain speed.

As is shown in FIG. 22, the region in the lower side of the screen, which is the region of interest, is updated in four stages from each of frame 1_1 to 1_4. Therefore, it becomes such that the vehicle that is stopped gradually becomes an image with a high luminance as the accumulation period becomes longer from the frame 1_1 to 1_4. In addition, blur occurs on the moving vehicle before and after its travel direction as the accumulation period becomes longer from the frame 1_1 to 1_4, and the illuminance for the portions in which the movement overlaps becomes high.

In contrast, the region in the upper side of the screen, which is the region of non-interest, is updated only for the output for the frame 1_4. Therefore, the vehicle that is stopped is updated every full frame, and image capturing is performed during the accumulation period for the full frame period, and therefore, this becomes an image with a high luminance. In addition, the moving vehicle is also updated for each full frame in the same manner, and is image captured during the accumulation period for the full frame period and therefore, blur occurs before and after the travel direction, and the luminance becomes high for the portions in which movements overlap.

Therefore, the images for the frame 1_1 to the frame 1_3 in the region of non-interest are all images that have been captured during the accumulation period for the frame 1_4 during the previous full frame period. In addition, during the frame 1_4, these are updated to images that have been captured during the accumulation period for the frame 1_4 during the current accumulation period.

In this manner, by following the flow in FIG. 20, and FIG. 21, and by updating the region of interest four times during a full frame period, it becomes possible to acquire images with less time than a full frame period, and it is possible to perform recognition more quickly. In contrast, the region of non-interest is only updated once during a full frame period, and therefore, it is possible to decrease the amount of data, and it becomes possible to decrease the energy consumption.

The following processing is performed according to the properties and usages of the photoelectric conversion device 600 based on the image data that has been created according to the flowcharts in FIG. 20, and FIG. 21.

For example, in the case of a security camera, behavior monitoring, image capturing, and recording of target people is performed by the control unit 605. In addition, it becomes possible to perform the display of warnings, the illumination of a light that is attached to the security camera, the generation of a warning noise, and the like, via the communications unit 607 based on the circumstances.

In addition, in the case of a vehicle-mounted camera, and the like, it becomes possible to perform caution reminders, to display warnings, or to perform operations of a safety device for reducing the speed of a vehicle, or bringing the vehicle to a stop using the vehicle control unit 702, and the like, via the ECU of the control unit 605, and it becomes possible to reduce or avoid collisions.

In addition, it also becomes possible to acquire images during an appropriate accumulation period when a person is inside of an image capturing region by, for example, making this a camera and performing person recognition, or performing the recognition of a face that has been registered. In addition, if this is a pet camera, it becomes possible to recognize a pet, and to remotely confirm the state of the pet, or to capture images of the pet.

In addition, in a case in which this is used as a surveillance camera, it is possible to set a specific location or region as the region of interest in order to grasp a situation or to perform the surveillance, prevention, or recording of malpractice as the collection of evidence in a location in which safety management or surveillance is required (for example, in a parking lot, a public facility, a factory, and the like). It thereby becomes possible to monitor the region of interest at a higher frequency, and to record and display video images and audio.

In addition, in the case in which the present invention is used as a defect detecting camera for a factory, this can also be used in order to support the quality management and efficiency of the manufacturing process, to detect and eliminate defective products at an early stage, to perform troubleshooting for the production line, to improve product quality, and the like. In this case, it becomes possible to more precisely detect and record defects and abnormalities in products in the manufacturing line or worksite of a factory.

In addition, in a case in which the present invention is used as a packaging inspection camera in a factory, it becomes possible to inspect the accuracy of or defects in the packaging state and labeling of a product in order to strengthen the quality management for the product and to ensure the integrity of the packaging and the accuracy of the labeling.

In the case in which the present invention is used as a classification camera for use in distribution, it is possible to increase the efficiency and accuracy of distribution operations in a distribution warehouse, a delivery center, and the like, and to realize appropriate product management and a rapid delivery process. In addition, it becomes possible to recognize the shape, the size, the barcode, and the like of a product or package, and to perform correct classification and delivery processing, In the case in which the present invention is used as an endoscopic camera, it becomes possible to acquire high quality video images of the inside of the body and organs using a camera that has been incorporated into an endoscope for use in a medical field in order to more precisely monitor conditions inside of the body and to support the diagnosis of illnesses and the formulation of treatment plans during endoscopic surgery or diagnostics.

In a case in which the present invention is used as a camera for detecting situations in which nursing care is required, it becomes possible to monitor the living conditions of an elderly individual or an individual in need of nursing care and to detect abnormal or dangerous situations in order to perform the early detection of falls, abnormal actions, and emergency situations, and to offer support in the case thereof, with the goal of ensuring the safety of the individual in need of nursing care and offering them living support.

In the case in which the present invention is used as a camera for monitoring infrastructure, it becomes possible monitor infrastructure such as roads, bridges, railways, power production plants, and the like, and to detect abnormalities, damage, or illegal activities in order to maintain their safety and reliability and to perform early warnings and appropriate conservation management.

In addition, in the case that this is used as a camera for monitoring infrastructure, it becomes possible to monitor public locations and facilities, or specific areas, and to perform the prevention, monitoring and recording of malpractices or criminal actions in order to ensure public safety, reduce crime, prevent malpractice, or collect evidence for incident investigations, and the like.

In addition, in a case in which the present invention is used as an agricultural camera, it is possible to support appropriate cultivation management, the early detection of pests, and the implementation of effective agricultural practices in order to increase the productivity and quality of an agricultural product. In this case, it becomes possible to monitor the cultivation state of an agricultural product or the appearance of pests, and to provide video image data that is useful in agricultural production management.

Tenth Embodiment

Next, in the Tenth Embodiment, a method for setting the accumulation period for the region of interest according to the brightness and the like of the region of interest will be explained.

It has been explained that in a surveillance camera or a vehicle-mounted camera attached to a movable apparatus, it is effective to acquire images of a subject at a short distance and a subject to the side of the movable apparatus at a fast timing with a short accumulation period. However, in contrast, it is known that when the accumulation period is short, the noise ratio in the signal components increases, and the so-called S/N becomes worse.

This becomes incredibly apparent in cases in particular in which a dark region has been image captured. Therefore, in a case in which the region of interest is dark, even if images are acquired with a short accumulation period, these will become images with a poor S/N, and the appropriate display of these images and their usage in later processing become difficult.

Therefore, there is the problem that it becomes difficult to make appropriate determinations, and the energy consumption of the device increases due to performing processing that would usually be unnecessary. Therefore, in the Tenth Embodiment, a method is explained in which an image with a good S/N is captured by adjusting the accumulation period according to the brightness of the region of interest.

Figure 23:
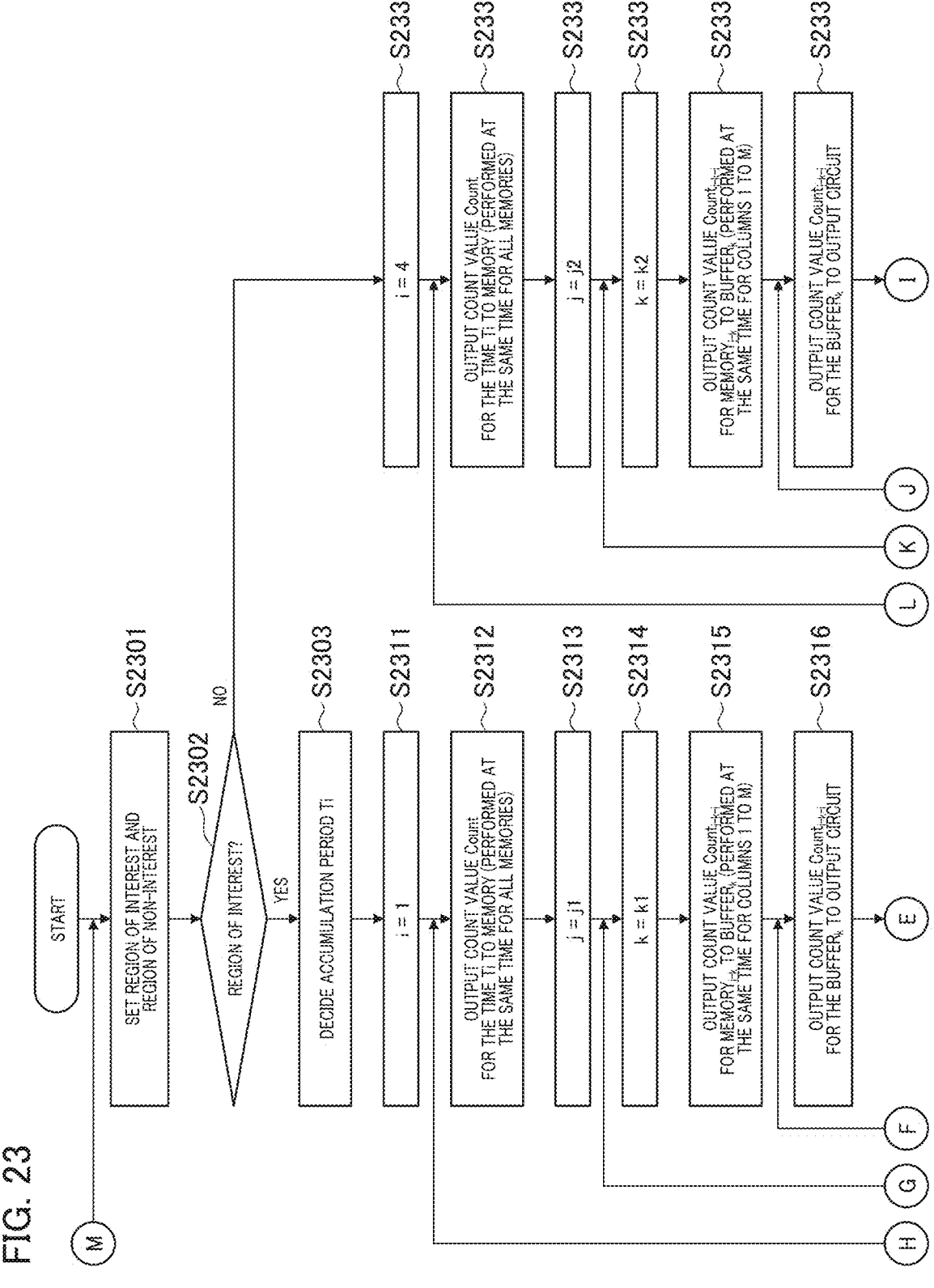
FIG. 23 is a flowchart showing details of an example in which an accumulation period is set and drive of a sensor unit 100 is performed in a Tenth Embodiment.
Figure 24:
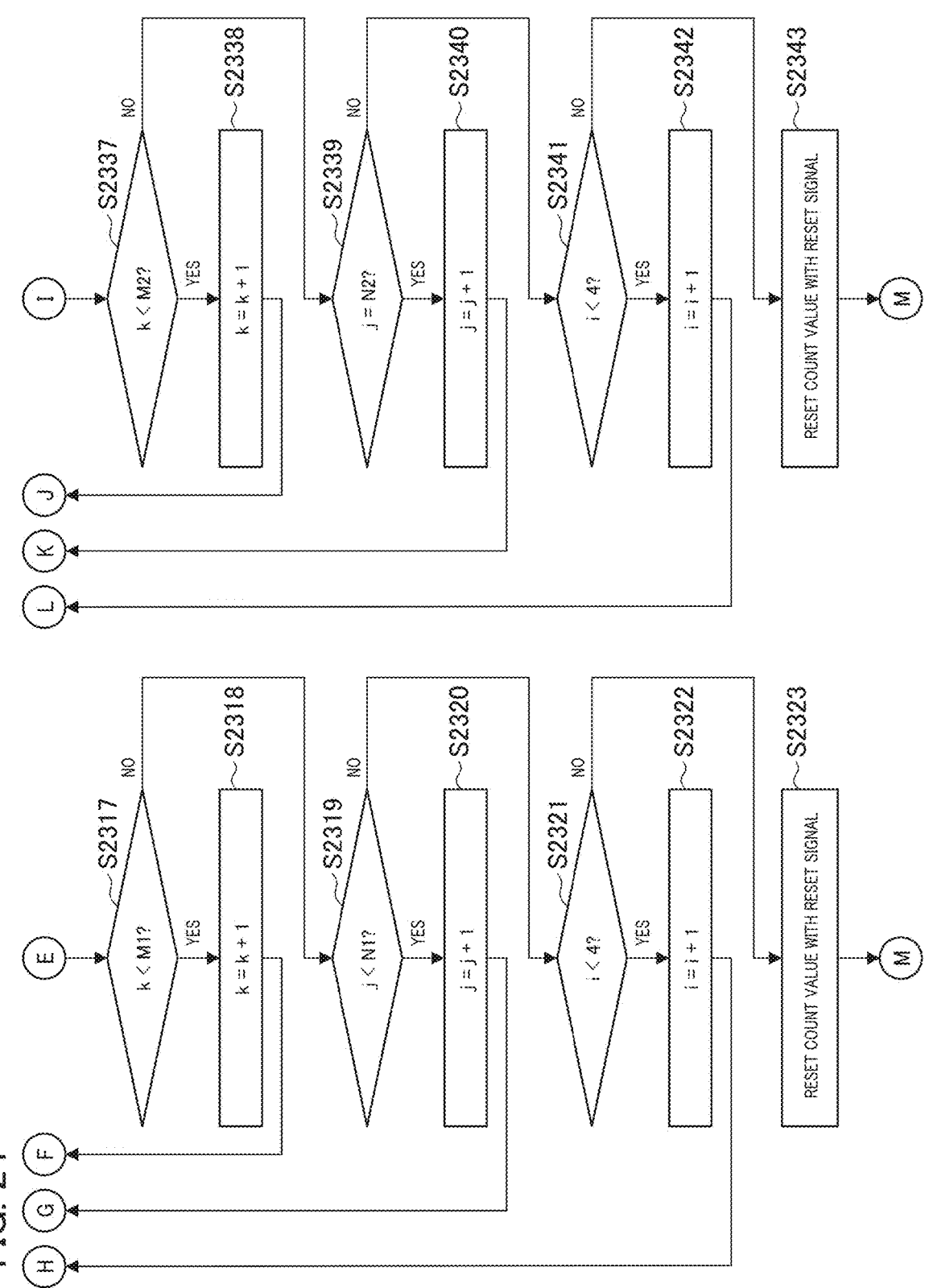
FIG. 24 is a flowchart that is a continuation of FIG. 23.

FIG. 23 is a flowchart showing the details of an example in which in the Tenth Embodiment, the drive of the sensor unit 100 is performed after setting the accumulation period, and FIG. 24 is a flowchart that is a continuation of FIG. 23. Note that the operations for each step of the flowcharts in FIG. 23, and FIG. 24 are performed in order by the CPU that serves as a computer inside of the control unit 605 executing the computer program that has been stored on the memory.

First, during step S2301, the CPU of the control unit sets the region of interest. In the same manner as the previous embodiments, the region of interest is set based on at least one piece of information from among the product information, installation information, and environmental information for the photoelectric conversion device 600, which are recorded in the control unit 605 of the photoelectric conversion device 600.

Next, during step S2302, the CPU of the control unit determines if a region is a region of interest or a region of non-interest. For a region of interest, the processing transitions to step S2311 of FIG. 23, and the CPU of the control unit performs processing to determine the accumulation period. In contrast, for a region of non-interest, the processing transitions to step S2331.

Next, during step S2303, the CPU of the control unit decides the accumulation period for the region of interest. In the present embodiment, for example, the average luminance value for the image that was acquired during the previous frame in the region of interest is calculated in the control unit 605, the LUT (look up table) for the accumulation period and the formula corresponding to this luminance value are recorded on the memory of the control unit 605, and these are used to find the accumulation period.

In this manner, in the present embodiment, the length of at least one of the first accumulation period and the second accumulation period are set based on the luminance information for a signal that is generated during at least one of the first accumulation period and the second accumulation period.

Note that the luminance value is not limited to just the average luminance, and it may also be calculated based on histogram peaks, deviations in peaks, or the spread or dispersion of peaks, and the like. In addition, the difference in luminance between adjacent pixels within an image may be found, and the noise amount calculated from a histogram of these differences, and the accumulation period may also be calculated based on the results thereof. Furthermore, the calculation is not limited to the previous full frame, and this may also be calculated from an average value for a plurality of previous full frames, or this may also be calculated from the average luminance of, a histogram, and the like for each accumulation period within a full frame period.

Although in the present embodiment, flowcharts for the case in which there are four accumulation periods are shown in FIG. 23, and FIG. 24, the accumulation periods are not limited to four, and there may also be one, three, or more than four accumulation periods. In addition, during step S23011, the CPU of the control unit sets the accumulation period (Ti) that has been calculated.

During step S2311 of FIG. 23, the CPU of the control unit sets i=1. Next, during step S2312, the CPU of the control unit outputs the count value Count for the counter 211 during the time Ti to the memory 212. At this time, output is performed to every memory at the same time. This operation corresponds to the operation for the time T1 in FIG. 7.

Next, during step S2313, the CPU of the control unit sets j=j1. j1 is the start position for the N rows of the region of interest. Next, during step S2314, the CPU of the control unit sets k=k1. k1 is the starting position for the M columns of the region of interest.

During step S2315, the CPU of the control unit outputs the count value Count (j–k–i) for the memory j–k of FIG. 9 to the buffer. At this time, output is performed to the buffers for the $1^{st}$ column to the $M^{th}$ column at the same time. This operations means an operation for taking the count values for the first row in FIG. 9 into the buffers.

During step S2316, the CPU of the control unit outputs the count value Count (j–k–i) for the buffer k to the output circuit. This operation corresponds to an operation for reading out the signals for the buffers for the leftmost column of FIG. 9 from the output circuit.

Next, the processing proceeds to step S2317 of FIG. 24 via E, and during step S2317, the CPU of the control unit determines if k<M1, and in the case of Yes, during S2318, the CPU of the control unit increases k by one by making this k=k+1, and the processing returns to step S2316 via F. M1 is the ending position for the M columns of the region of interest. This operation corresponds to an operation for reading out the signals for the buffers for the second column from the left in FIG. 9 from the read-out circuit.

In the case of No during step S2317, that is, in the case in which it has been made such that k=M1, this means that the read out of the signals from the buffers for the $M^{th}$ column in FIG. 9 from the output circuit has been completed, and next, the processing proceeds to step S2319, and the CPU of the control unit determines if j<N1.

N1 is the ending position for the N rows of the region of interest. In the case of Yes during step S2319, during step S2320, the CPU of the control unit increase j by one by making this j=j+1, and the processing returns to step S2314 via G. This corresponds to the process for starting the read out for the next row.

In a case in which No has been determined during step S2319, this means that the read out of all of the rows has been completed, and therefore, the processing proceeds to step S2321, and the CPU of the control unit determines whether or not i<4. In the case in which Yes is determined during step S2321, the CPU of the control unit increases i by one by making this i=i+1, and the processing returns to S2312 via H. This operation corresponds to an operation for starting the readout for the next time T2.

In a case in which No has been determined during step S2321, this means that the read out during the time T4 has been completed, and therefore, the processing proceeds to step S2323, and the CPU of the control unit resets the counter 211 using the reset signal.

This operation corresponds to an operation for resetting the counter 211 for the time T4 in FIG. 7. After step S2113, the processing returns to step S2301 via M. In the manner that was described above, it is possible to read out the signals that have been accumulated in the sensor unit in order.

In contrast, the accumulation period for the region of non-interest is the same as the full frame period, and therefore, images are acquired during an established accumulation period. That is, during step S2331 of FIG. 23, the CPU of the control unit sets i=4. Next, during step S2332, the CPU of the control unit outputs the count value Count for the counter 211 during the time Ti to the memory 212. At this time, output is performed to every memory at the same time. This operation corresponds to the operation for the time T1 in FIG. 7.

Next, during step S2333, the CPU of the control unit sets j=j2. j2 is the starting position for the N rows of the region of non-interest. Next, during step S2334, the CPU of the control unit sets k=k2. k2 is the starting position for the M columns of the region of non-interest.

During step S2335, the CPU of the control unit outputs the count value Count (j–k–i) in the memory j–k of FIG. 9 to the buffer. At this time output to the buffers is performed at the same time for the $1^{st}$ row to the $M^{th}$ column. This operations means an operation for taking the count value for the first row in FIG. 9 into the buffers.

During step S2336, the CPU of the control unit outputs the count value Count (j–k–i) for the buffer k to the output circuit 114. This operation corresponds to an operation for reading out the signals for the buffers for the leftmost column in FIG. 9 from the output circuit.

Next, the processing proceeds to step S2337 of FIG. 24 via I, and during step S2337, the CPU of the control unit determines if k<M2, and in the case of yes, during step S2338, the CPU of the control unit increases k by one by making this k=k+1, and the processing returns to step S2336 via J. M2 is the ending position for the M columns of the region of non-interest. This operation corresponds to an operation for reading out the signals for the buffers for the second column from the left in FIG. 9 from the read-out circuit.

In the case of No during step S2337, that is, in a case in which it has become such that k=M2, this means that the readout of the signals for the buffers for the $M^{th}$ column of FIG. 9 from the read-out circuit has been completed, and next the processing proceeds to step S2339, and the CPU of the control unit determines if j<N2.

N2 is the ending position for the N rows of the region of interest. In the case of Yes during step S2339, during step S2340 the CPU of the control unit increases j by one by making this j=j+1, and the processing returns to step S2344 via K. This corresponds to the process for starting the read out of the next row.

In the case in which No has been determined during step S2339, this means that the read out for all of the rows has been completed, and therefore, the processing proceeds to step S2341, and the CPU of the control unit determines whether or not i<4. In a case in which Yes has been determined during step S2341, the CPU of the control unit increases i by making this i=i+1, and the processing returns to step S2332 via L. This operation corresponds to an operation for starting the read out for the next time T2. However, during step S2331, i=4 has been set, and therefore, step S2341 becomes No.

In the case in which No has been determined during step S2341, this means that the read out during the time T4 has been completed and therefore, the processing proceeds to step S2343, and the CPU of the control unit resets the counter 211 using the reset signal. This operation corresponds to an operation for resetting the counter 211 for the time T4 in FIG. 7. After step S2434, the processing returns to step S2301 via M.

In the above explained manner, it is possible to read out the signals that have been accumulated in the sensor in order. Note that it is also possible to acquire images during an accumulation period that has been determined by the control unit 605 for the region of non-interest in the same manner. In this case, a flow to set the accumulation period is added before acquiring the image.

For example, although in the above-described embodiment, accumulation is performed for at the shortest ¼ of a full frame period, the length of the shortest accumulation period may also be changed to, for example, ⅕ of a full frame period, or ⅓ of a full frame period according to the recognition precision in the recognition unit 604. Conversely, the length of the shortest accumulation period may also be changed according to the brightness of the subject. In addition, the recognition unit may also be made so as to recognize a subject based on a signal that is further generated during the second accumulation period.

Furthermore, even in a case in which the readout cycle is made each ¼ full frame period, the counter may also be reset during the accumulation period for the frame 1_1 of FIG. 7 according to the brightness of the subject, the image recognition precision, and the like. The substantial accumulation period may also thereby be made shorter than ¼ of a full frame period.

Conversely, the counter may also be temporarily reset during the time T1 and the like of FIG. 7. It may also thereby be made such that the count value that is read out during the time T4 is adjusted. Note that although in the above-described embodiments it has been made such that the accumulation periods are all equal intervals, the present invention is not limited thereto.

In addition, in the above-described embodiments, an example has been explained in which various processing is performed using each type of camera, and a device and a computer, and the like that have been attached to the camera based on image data that has been captured.

For example, in the case of a surveillance camera, behavioral monitoring, image capturing, and recording of a target person is performed by the control unit 605. In addition, the display of a warning, the illumination of a light that has been attached to the surveillance camera, the generation of an audio warning, and the like are performed via the communications unit 607 based on the circumstances. In addition, in the case of a vehicle-mounted camera, and the like, caution reminders, the display of warnings, or operations of a safety device for reducing the speed of a vehicle, or bringing the vehicle to a stop using the vehicle control unit 702, and the like are performed by the control unit 605 via the ECU 701.

Eleventh Embodiment

In the Eleventh Embodiment, before the various processing is performed, the control unit 605 determines if the image that has been acquired by the photoelectric conversion device 600 is a suitable image on which to perform the processing that will occur after this. It thereby becomes possible to more largely decrease the burden of the processing, and to realize a reduction in the processing load, a reduction in the energy consumption, and the like. Furthermore, it is possible to avoid the occurrence of incorrect warnings in a surveillance camera, incorrect operations of the safety device for the vehicle-mounted camera, and the like after making an incorrect determination due to an unsuitable image.

In the Eleventh Embodiment, the image data that has been captured is evaluated in the control unit 605. In addition, it is determined whether an image is suitable or not using the average luminance value and the like for the output of each full frame, and in the case of a suitable image, it is determined if the following processing will be performed.

Figure 25:
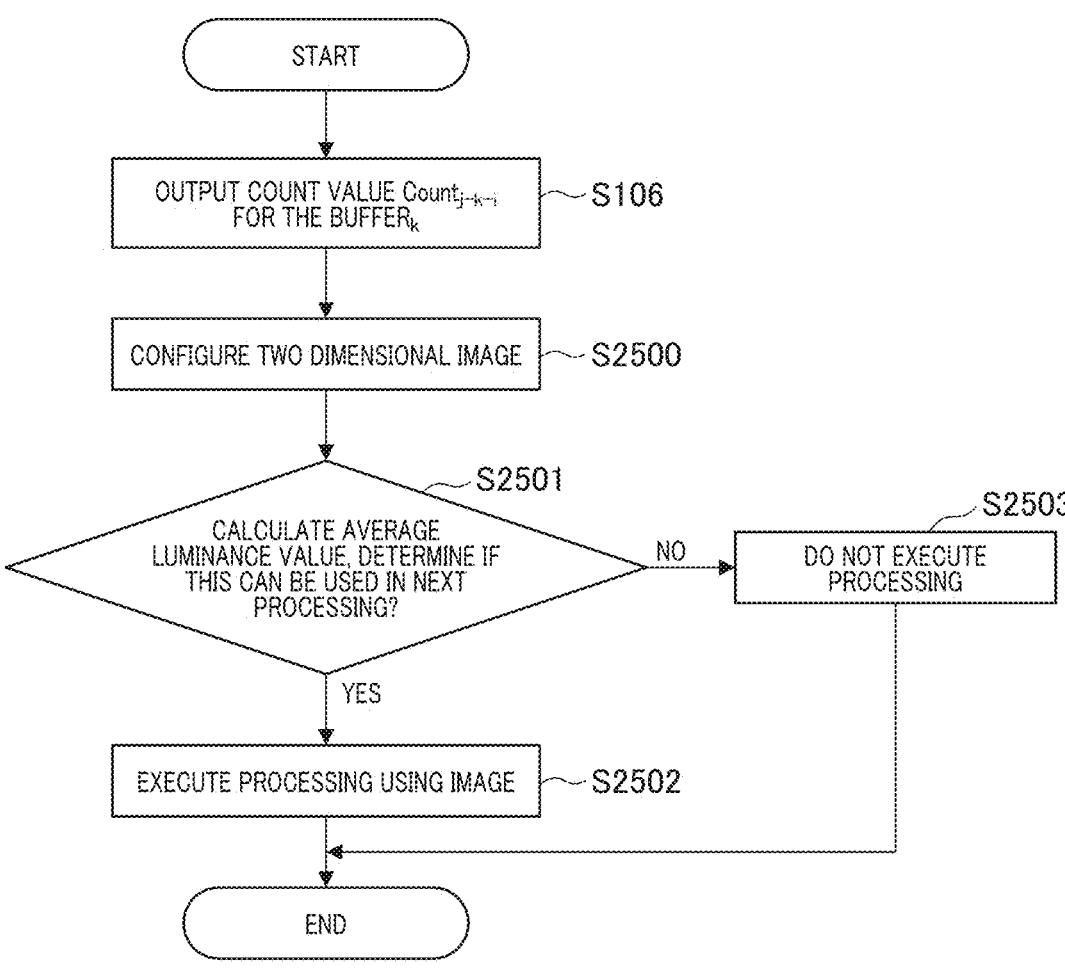
FIG. 25 is a flowchart showing an example of operations in a control unit after an image has been configured in an Eleventh Embodiment.

FIG. 25 is a flowchart showing an example of operations in the control unit after an image has been configured according to the Eleventh Embodiment. Note that the operations for each step of the flowchart in FIG. 25 are performed in order by the CPU that serves as a computer inside of the control unit 605 executing the computer program that has been stored on the memory.

For example, the example that is shown in FIG. 10, and FIG. 11 is used as the processing flow up until an image is acquired. First, during step S2500, the CPU of the control unit uses the count value that has been output during step S106 of FIG. 10, and configures an image.

Next, during step S2501, the CPU of the control unit determines if an image is suitable for use in the processing to occur after. In this context, an image that is not suitable indicates an image with a poor S/N with a large amount of noise, or an image that is too dark and in which recognition would be difficult.

It is possible to use the average luminance data for the acquired image as the determining method during step S2501. That is, the value for the average luminance is calculated in the control unit 605, and whether or not this image can be used in the following processing is determined in accordance with this value. That is, the control unit determines whether or not to execute predetermined processing in the control unit according to the luminance information for a signal that is generated during at least one of the first accumulation period and the second accumulation period.

In addition, the determination method is not limited to the average luminance, and this can also be determined based on histogram peaks, deviations in peaks, or the spread or dispersion of peaks, and the like. In addition, the difference in luminance between adjacent pixels within the screen may be found, a noise amount may be calculated based on a histogram of these differences, and whether or not this image can be used in the following processing may also be determined based on these results.

Furthermore, this is not limited to the previous full frame, and the determination may also be made based on an average value from a plurality of previous frames, or a determination may also be made based on an average luminance, a histogram, and the like of each accumulation period within a full frame. If it has been determined during step S2501 that an image is suitable, next, during step S2502, the CPU of the control unit executes processing using the computer program and the like of the control unit 605.

In contrast, in a case in which it has been determined that an image is not suitable, during step S2503, the CPU of the control unit does not perform the processing using the computer program of the control unit 605 on this image, and the processing of the computer program is stopped until an image is acquired for the next accumulation period.

By performing a processing flow such as that shown in FIG. 25, it is possible to reduce the number of times that unnecessary processing is performed in the control unit 605, and it becomes possible to decrease the product power consumption. In addition, it is possible to avoid the occurrence of incorrect warnings in a surveillance camera, incorrect operations of the safety device of a vehicle-mounted camera, and the like based on incorrect determinations due to an image that was not suitable.

Twelfth Embodiment

Although in the above-described embodiments, an example has been explained in which regions were segmented in both the N rows and the M columns, the effects of the present invention are not limited thereto.

Figure 26:
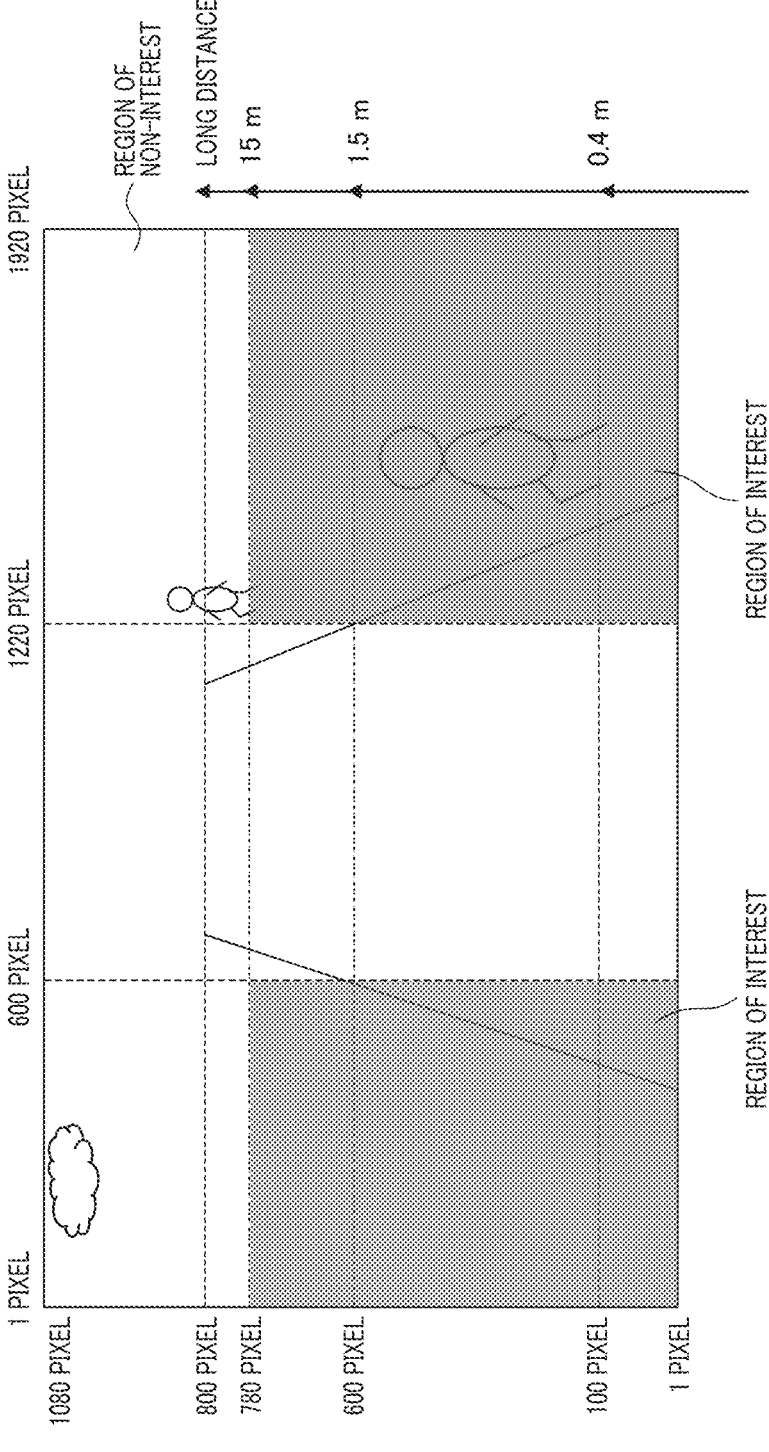
FIG. 26 is a diagram explaining an example of setting a region of interest in a Twelfth Embodiment.

FIG. 26 is a diagram explaining an example of setting the region of interest in the Twelfth Embodiment. As is shown in FIG. 26, the region of interest may also be set so as to combine both the row direction and the column direction. For example, as is shown in gray in FIG. 26, by setting the region of interest, it is possible to perform image capturing with different accumulation periods at a short distance and in the side direction. Therefore, this is effective in monitoring using a surveillance camera as well as in collision prevention using a vehicle-mounted camera, and this is also effective in decreasing the amount of data and the energy consumption.

Thirteenth Embodiment

Figure 27:
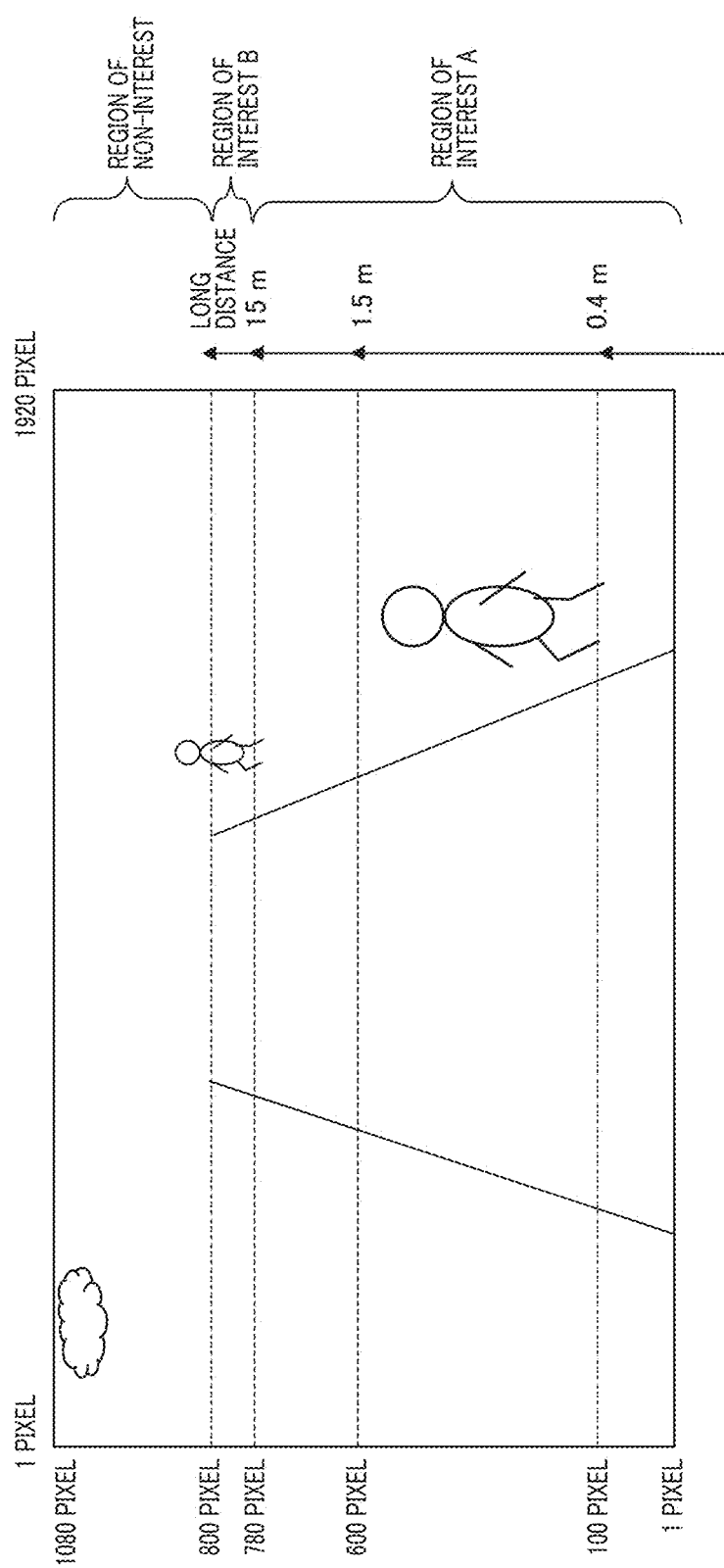
FIG. 27 is a diagram explaining an example of setting a region of interest in a Thirteenth Embodiment.

FIG. 27 is a diagram explaining an example of setting the region of interest in the Thirteenth Embodiment. As is shown in the regions of interest A, and B in FIG. 27, a plurality of regions of interest may also be set, and the accumulation periods may also be made to be different for each region of interest.

In addition, a region of interest in the column direction in relation to the travel direction may also be changed according to, for example, handle operation information. In addition, it may also be made such that the travel direction and its surroundings, as well as surroundings that can easily become blind sports are set as the region of interest in order to prevent accidents when turning left or right. Further additionally, as has been described above, changing the region of interest flexibly based on the situation according to map information, GPS information, the road conditions, and the like is effective in a case in which the present invention is installed in a movable apparatus.

Note that although in the above-described embodiments, an explanation has been given using an example in which the movable apparatus 700 is, for example, a vehicle, a movable apparatus may also be any apparatus that is able to be moved such as an airplane, a train, a boat, a drone, an AGV, and the like.

In addition, the photoelectric conversion device 600 of the above-described embodiments is not limited to being attached to a movable apparatus, and may also be attached to a wall, a post, and the like. In this case, when the photoelectric conversion device 600 is attached to a wall, a post, and the like, it is preferable that the installation height, the installation angle, and the like are held in the storage unit 606 and the like to serve as the installation information.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the photoelectric conversion device and the like through a network or various storage media. Then, a computer (or a CPU, an MPU, and the like) of the photoelectric conversion device and the like may be configured to read and execute the program. In such a case, the program and the storage medium storing the program configure the present invention.

In addition, the present invention includes those realized using at least one processor or circuit configured to perform functions of the embodiments explained above. For example, a plurality of processors may be used for distribution processing to perform functions of the embodiments explained above.

This application claims the benefit of priority from Japanese Patent Application No. 2023-139371, filed on Aug. 29, 2023, which is hereby incorporated by reference herein in its entirety.

What is claimed is:

1. A photoelectric conversion device comprising:
an optical system;
a plurality of pixels each of which is configured to include a photoelectric conversion unit that generates pulses in response to photons, a counter configured to count a number of the pulses, and a memory configured to store a count value for the counter;
one or more memories storing instructions; and
one or more processors executing the instructions to:
generate a signal based on a difference between count values for the counter between a start time and an end time of an accumulation period in the photoelectric conversion unit;
perform control such that a signal that is generated during a first accumulation period that is shorter than a second accumulation period is output during a time from an end of the first accumulation period until an end of the second accumulation period wherein one full frame period includes the first accumulation period and the second accumulation period that is longer than the first accumulation period;
make it possible to set, in a sensor unit including the plurality of pixels, a first pixel region having at least the first accumulation period and the second accumulation period, and a second pixel region having at least the second accumulation period; and
set the first pixel region and the second pixel region based on at least one type of information from among characteristic information relating to characteristics of a photoelectric conversion device, installation information relating to an installation state of the photoelectric conversion device, and environmental information relating to a surrounding environment of the photoelectric conversion device.

2. The photoelectric conversion device according to claim 1, wherein the first accumulation period and the second accumulation period overlap.

3. The photoelectric conversion device according to claim 2, wherein the first accumulation period and the second accumulation period start at the same time.

4. The photoelectric conversion device according to claim 2, wherein the end time of the second accumulation period coincides with the end time of the full frame period.

5. The photoelectric conversion device according to claim 1, wherein the one or more processors further execute the instructions to recognize a subject based on a signal that is generated during at least the first accumulation period.

6. The photoelectric conversion device according to claim 5, wherein the one or more processors further execute the instructions to recognize the subject further based on a signal that is generated during the second accumulation period.

7. The photoelectric conversion device according to claim 1, further comprising a display unit configured to display a signal that is generated during at least the second accumulation period as an image.

8. The photoelectric conversion device according to claim 1, wherein the sensor unit comprises an avalanche photo-diode.

9. The photoelectric conversion device according to claim 1, wherein the one or more processors further executes the instructions to set at least one of a position, size, and accumulation period of the first pixel region or the second pixel region based on at least one from among the characteristic information, the installation information, and the environmental information.

10. The photoelectric conversion device according to claim 1, wherein the characteristic information comprises at least one of optical characteristic information of the optical system, resolution information of the sensor unit, and a pixel size of the sensor unit.

11. The photoelectric conversion device according to claim 1, wherein the installation information comprises at least one of a height, an angle, and a direction in which the photoelectric conversion device is installed.

12. The photoelectric conversion device according to claim 1, wherein the one or more processors further execute the instructions to set the first pixel region or the second pixel region according to distance information to a subject.

13. The photoelectric conversion device according to claim 1, wherein the one or more processors further execute the instructions to set a length of at least one of the first accumulation period and the second accumulation period based on luminance information for a signal that is generated during at least one of the first accumulation period and the second accumulation period.

14. The photoelectric conversion device according to claim 1, wherein the one or more processors further execute the instructions to control whether or not to execute predetermined processing according to luminance information for a signal generated during at least one of the first accumulation period and the second accumulation period.

15. A movable apparatus comprising:
an optical system;
a plurality of pixels each of which is configured to include a photoelectric conversion unit that generates pulses in response to photons, a counter configured to count a number of the pulses, and a memory configured to store a count value for the counter;
one or more memories storing instructions; and
one or more processors executing the instructions to:
generate a signal based on a difference between count values for the counter between a start time and an end time of an accumulation period in the photoelectric conversion unit;
perform control such that a signal that is generated during a first accumulation period that is shorter than a second accumulation period is output during a time from an end of the first accumulation period until an end of the second accumulation period wherein one full frame period includes the first accumulation period and the second accumulation period that is longer than the first accumulation period;
make it possible to set, in a sensor unit consisting of the plurality of pixels, a first pixel region having at least the first accumulation period and the second accumulation period, and a second pixel region having at least the second accumulation period;

set the first pixel region and the second pixel region based on at least one type of information from among characteristic information relating to characteristics of a photoelectric conversion device, installation information relating to an installation state of the photoelectric conversion device, and environmental information relating to a surrounding environment of the photoelectric conversion device;

control operations of the movable apparatus; and set the first pixel region or the second pixel region according to the control of the movable apparatus.

16. A control method for controlling a photoelectric conversion device comprising an optical system, a plurality of pixels each of which is configured to include a photoelectric conversion unit that generates pulses in response to photons, a counter configured to count a number of the pulses, and a memory configured to store a count value for the counter, the method comprising:

generating a signal based on a difference between count values for the counter between a start time and an end time of an accumulation period in the photoelectric conversion unit;

performing control such that a signal that is generated during a first accumulation period that is shorter than a second accumulation period is output during a time from an end of the first accumulation period until an end of the second accumulation period, wherein one full frame period includes the first accumulation period and the second accumulation period that is longer than the first accumulation period;

making it possible to set, in a sensor unit consisting of the plurality of pixels, a first pixel region having at least the first accumulation period and the second accumulation period, and a second pixel region having at least the second accumulation period; and setting the first pixel region and the second pixel region based on at least one type of information from among characteristic information relating to characteristics of a photoelectric conversion device, installation information relating to an installation state of the photoelectric conversion device, and environmental information relating to a surrounding environment of the photoelectric conversion device.

17. A non-transitory computer-readable storage medium configured to store a computer program comprising instructions for executing following processes:

in order to control a photoelectric conversion device comprising an optical system, a plurality of pixels each of which is configured to include a photoelectric conversion unit that generates pulses in response to photons, a counter configured to count a number of the pulses, and a memory configured to store a count value for the counter, generating a signal based on a difference between count values for the counter between a start time and an end time of an accumulation period in the photoelectric conversion unit;

performing control such that a signal that is generated during a first accumulation period that is shorter than a second accumulation period is output during a time from an end of the first accumulation period until an end of the second accumulation period, wherein one full frame period includes the first accumulation period and the second accumulation period that is longer than the first accumulation period;

making it possible to set, in a sensor unit consisting of the plurality of pixels, a first pixel region having at least the first accumulation period and the second accumulation period, and a second pixel region having at least the second accumulation period; and setting the first pixel region and the second pixel region based on at least one type of information from among characteristic information relating to characteristics of a photoelectric conversion device, installation information relating to an installation state of the photoelectric conversion device, and environmental information relating to a surrounding environment of the photoelectric conversion device.

* * * * *